(12) United States Patent
Miyairi et al.

(10) Patent No.: US 9,700,842 B2
(45) Date of Patent: Jul. 11, 2017

(54) HONEYCOMB FILTER

(71) Applicant: NGK Insulators, Ltd., Nagoya (JP)

(72) Inventors: Yukio Miyairi, Nagoya (JP); Kazuhiko Kumazawa, Nagoya (JP); Toshihiro Hirakawa, Nagoya (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 133 days.

(21) Appl. No.: 14/840,466

(22) Filed: Aug. 31, 2015

(65) Prior Publication Data

US 2016/0067653 A1 Mar. 10, 2016

(30) Foreign Application Priority Data

Sep. 4, 2014 (JP) ................................. 2014-180014

(51) Int. Cl.
*B01D 50/00* (2006.01)
*B01D 53/94* (2006.01)
(Continued)

(52) U.S. Cl.
CPC ......... *B01D 53/945* (2013.01); *B01D 46/247* (2013.01); *B01D 46/2459* (2013.01); *B01D 46/2474* (2013.01); *B01J 23/63* (2013.01); *B01J 35/026* (2013.01); *B01J 35/04* (2013.01); *B01J 37/0228* (2013.01); *B01J 37/0234* (2013.01); *B01J 38/12* (2013.01); *C04B 38/0009* (2013.01); *B01D 53/944* (2013.01); *B01D 53/9418* (2013.01); *B01D 2046/2433* (2013.01); *B01D 2046/2496* (2013.01);
(Continued)

(58) Field of Classification Search
CPC .......... B01D 2255/915; B01D 2255/50; B01D 46/2474; B01D 53/945; B01D 2255/1021; B01D 2046/2433
USPC ..................... 422/177, 180; 55/523; 428/116
See application file for complete search history.

(56) References Cited

U.S. PATENT DOCUMENTS 4,276,071 A * 6/1981 Outland ............... B01D 46/247
428/116
4,417,908 A * 11/1983 Pitcher, Jr. ......... B01D 46/0001
210/510.1
(Continued)

FOREIGN PATENT DOCUMENTS

EP        2 216 084 A1    8/2010
JP       2004-000896 A1    1/2004
(Continued)

Primary Examiner — Tom P Duong
(74) Attorney, Agent, or Firm — Burr & Brown, PLLC

(57) ABSTRACT

In a cross section perpendicular to a central axis direction of the honeycomb substrate, cells are arranged so that a periphery of an inlet plugged cell is surrounded with four rectangular outlet plugged cells and four square outlet plugged cells, and in the cross section, a partition wall center distance a, a partition wall center distance b and a partition wall thickness t satisfy the following equation (1). Additionally, an amount of a catalyst per unit volume of partition walls which is loaded onto the partition walls defining the rectangular outlet plugged cells and the inlet plugged cells is larger than an amount of a catalyst per unit volume of the partition walls which is loaded onto the partition walls defining the rectangular outlet plugged cells and the square outlet plugged cells $$0.95 < b/a < 1.90 \qquad (1).$$

14 Claims, 7 Drawing Sheets

(51) Int. Cl.
  *B01D 46/24*   (2006.01)
  *B01J 37/02*   (2006.01)
  *B01J 38/12*   (2006.01)
  *B01J 23/63*   (2006.01)
  *B01J 35/02*   (2006.01)
  *B01J 35/04*   (2006.01)
  *C04B 38/00*   (2006.01)
  *C04B 111/00*  (2006.01)

(52) U.S. Cl.
  CPC ........... *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2255/50* (2013.01); *B01D 2255/9032* (2013.01); *B01D 2255/915* (2013.01); *B01D 2255/9155* (2013.01); *B01D 2258/012* (2013.01); *C04B 2111/0081* (2013.01); *C04B 2111/00793* (2013.01); *Y02T 10/22* (2013.01)

(56) References Cited

U.S. PATENT DOCUMENTS

| | | | | |
|---|---|---|---|---|
| 4,419,108 | A * | 12/1983 | Frost | B01D 39/2075 210/510.1 |
| 7,867,944 | B2 * | 1/2011 | Konstandopoulos | B01D 53/944 502/439 |
| 8,673,064 | B2 * | 3/2014 | Ahmed | F01N 13/009 422/169 |
| 2003/0041730 | A1 * | 3/2003 | Beall | B01D 39/2068 95/273 |
| 2005/0076627 | A1 * | 4/2005 | Itou | B01D 39/2068 55/523 |
| 2006/0188415 | A1 * | 8/2006 | Ohno | B01D 46/0063 422/177 |

FOREIGN PATENT DOCUMENTS

JP   2010-053697 A1   3/2010
WO   2009/069378 A1   6/2009

\* cited by examiner

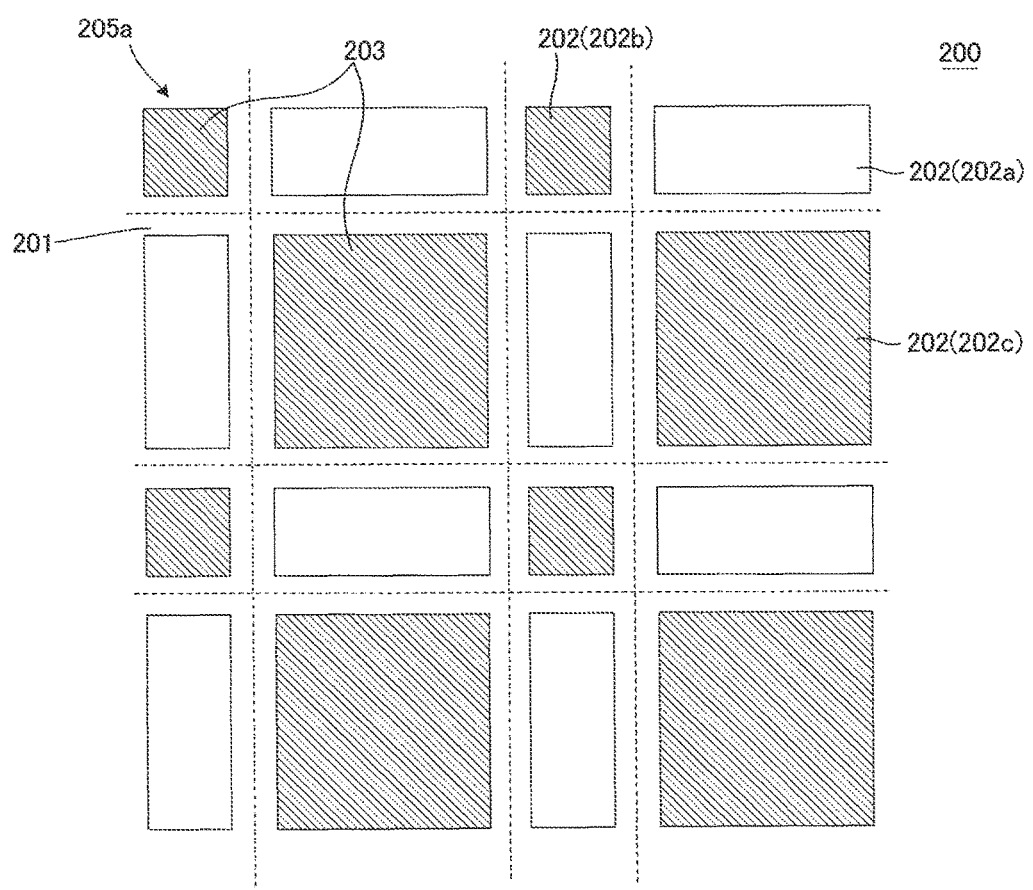

HONEYCOMB FILTER

The present application is an application based on JP 2014-180014 filed on Sep. 4, 2014 with Japan Patent Office, the entire contents of which are incorporated herein by reference.

BACKGROUND OF THE INVENTION

Field of the Invention

The present invention relates to a honeycomb filter. More particularly, it relates to a honeycomb filter to be suitably used in purification of particulate matter included in an exhaust gas from an engine, especially a car engine, and toxic gas components such as nitrogen oxides (NOx), carbon monoxide (CO) and hydrocarbons (HC).

Description of the Related Art

In recent years, reductions of fuel consumptions of cars have been required from the viewpoints of influences on the global environment and resource saving. Consequently, there is the tendency that internal combustion engines such a direct injection type gasoline engine and a diesel engine each having an excellent thermal efficiency are used as power sources for the cars.

On the other hand, in these internal combustion engines, generation of ashes generated during combustion of fuel raises problems. From the viewpoint of the air atmosphere, there are required countermeasures for removal of toxic components included in the exhaust gas and simultaneously, prevention of emission of particulate matter (hereinafter referred to as "the PM" sometimes) such as soot or ash to the atmosphere.

In particular, there is the tendency that regulations on the removal of the PM emitted from the diesel engine are strengthened worldwide, and use of a honeycomb filter as a trapping filter to remove the PM (hereinafter referred to as "the DPF" sometimes) attracts attention. Further, there have been suggested various exhaust gas purification systems in which such a honeycomb filter is used. The above DPF usually has a structure where a plurality of cells which become through channels for a fluid are usually defined by porous partition walls and cells are alternately plugged, whereby the porous partition walls constituting the cells perform a role of the filter.

In the DPF, the exhaust gas containing the particulate matter and the like flow in the DPF from a first end face (an inflow end face), the particulate matter is filtered with the partition walls, and then, the purified gas flows out from a second end face (an outflow end face). In such a DPF, there has been the problem that, with the inflow of the exhaust gas, the particulate matter contained in the exhaust gas is deposited on the partition walls to close the cells on an exhaust gas inflow side. This is a phenomenon which easily occurs in a case where a large amount of the particulate matter is contained in the exhaust gas, or in cold districts. When the cells are closed in this manner, the problem occurs that a pressure loss in the DPF rapidly enlarges. Therefore, to inhibit such cell closing, the filter is contrived to increase a filtration area or an open frontal area in the exhaust gas inflow side cells.

As the above structure of the DPF, specifically, a structure has been suggested in which a sectional area of each inflow side cell is different from a sectional area of each outflow side cell (e.g., see Patent Document 1). Here, the sectional area of each cell indicates the area of the cell in a cross section when the cell is cut along a plane perpendicular to a central axis direction of the cell. The inflow side cells are cells which are opened in the inflow end face and whose open ends in the outflow end face are plugged by plugging portions, and the cells are also referred to as outlet plugged cells. On the other hand, the outflow side cells are cells whose open ends in the inflow end face are plugged by the plugging portions and which are opened in the outflow end face, and the cells are also referred to as inlet plugged cells. Additionally, hereinafter, the structure in which the sectional area of each inflow side cell is different from the sectional area of each outflow side cell will be referred to as "the HAC structure" sometimes. "The HAC" is abbreviation for High Ash Capacity.

In addition, there has been suggested a honeycomb filter of the HAC structure which has inflow side cells whose sectional areas are large and outflow side cells whose sectional areas are small and in which a sectional shape of each inflow side cell is different from a sectional shape of each outflow side cell (e.g., see Patent Document 2). Here, the sectional shape of the cell is a shape which appears in a cross section of the cell when the cell is cut along a plane perpendicular to a central axis direction of the cell.

In addition, as another structure of the DPF, a structure has been suggested in which a periphery of a trapping cell group constituted of a plurality of inflow side cells (outlet plugged cells) is surrounded with a plurality of outflow side cells (inlet plugged cells) (e.g., Patent Document 3).

To use the honeycomb filter continuously for a long period of time, it is necessary to periodically subject the honeycomb filter to a regeneration treatment. That is, for the purpose of reducing the pressure loss enlarged due to the soot deposited in the honeycomb filter with an elapse of time to return a filter performance to an initial state, it is necessary to burn and remove the soot deposited in the honeycomb filter by a high-temperature gas. To smoothly perform such a regeneration treatment, a catalyst to burn and remove the soot is loaded onto the honeycomb filter in a certain case. As this catalyst, a noble metal such as platinum or palladium is used. Hereinafter, the burning and removal of the soot deposited in the honeycomb filter will simply be referred to as "regeneration" of the honeycomb filter sometimes.

[Patent Document 1] WO2009/069378
[Patent Document 2] JP-A-2004-000896
[Patent Document 3] JP-A-2010-053697

SUMMARY OF THE INVENTION

However, heightening of an open frontal area of inflow side cells (outlet plugged cells) relatively results in decrease of an open frontal area of outflow side cells (inlet plugged cells), and hence, there has been the problem that, with this decrease, a pressure loss in an initial stage (the initial pressure loss) disadvantageously heightens.

Furthermore, the decrease of the open frontal area of the outflow side cells (the inlet plugged cells) results in increase of a heat capacity on an inflow end face side due to plugging portions disposed on the inflow end face side of a DPF. In consequence, there has been the problem that temperature rise on the inflow end face side due to an exhaust gas becomes dull and continuous regeneration properties due to $NO_2$ worsen.

In addition, when inflow side cells (the outlet plugged cells) differs from the outflow side cells (the inlet plugged cells) in a sectional area and a sectional shape, a thickness of partition walls forming the cells becomes smaller in a part of a portion in which the partition walls intersect each other (hereinafter referred to as "the intersecting portion" sometimes) in a certain case, and there has been the problem that strength deteriorates. Consequently, there has been the problem that, when PM deposited on the DPF is burnt and removed by post injection, thermal stress is concentrated on a part of the thinned intersecting portion, and breakage such as generation of cracks is easily caused. Here, the portion (the intersecting portion) in which the partition walls intersect each other is a portion belonging to both of the partition walls intersecting each other in the cross section of a honeycomb filter such as the DPF cut along a plane perpendicular to a central axis direction of the filter. For example, when the linearly extending partition walls having the same thickness intersect each other, the intersecting portion in the above cross section is a range of a square sectional shape in the portion in which the partition walls intersect.

In a structure of a honeycomb filter described in Patent Document 3, a periphery of a trapping cell group constituted of a plurality of inflow side cells (outlet plugged cells) is surrounded with a plurality of outflow side cells (inlet plugged cells), and hence, PM in the honeycomb filter can be prevented from being rapidly burnt. Consequently, when the PM deposited on the honeycomb filter is burnt and removed, thermal stress is concentrated on a part of the honeycomb filter, and the generation of the cracks can be inhibited. However, in this structure of the honeycomb filter described in Patent Document 3, there has been the problem that, when the plurality of inflow side cells (the outlet plugged cells) are arranged discontinuously from one another, heat during the burning and removal of the PM is hard to be propagated to the adjacent inflow side cell (the outlet plugged cell), and the honeycomb filter cannot efficiently be regenerated.

Additionally, as described above, when the open frontal area of the inflow side cells (the outlet plugged cells) is heightened, there has been the problem that an amount of a noble metal for use as a catalyst increases, and manufacturing cost of the honeycomb filter increases.

The present invention has been developed in view of such problems of conventional technologies. According to the present invention, there is provided a honeycomb filter in which both of a pressure loss in an initial stage and a pressure loss during PM deposition are minimized, an efficiency of regeneration of the honeycomb filter during PM burning improves, and generation of cracks due to thermal stress is decreased. In addition, according to the present invention, there is provided a honeycomb filter in which an amount of a catalyst (especially, a noble metal) to be loaded onto partition walls can be decreased while maintaining a high efficiency of the regeneration to burn and remove soot deposited on the partition walls.

The present inventors have found that the above problem in the initial pressure loss and the pressure loss during the PM deposition and the above problem in the generation of the cracks can be solved by arranging inlet plugged cells and outlet plugged cells having predetermined shapes at predetermined positions. Furthermore, the present inventors have found that such a honeycomb filter can realize a high regeneration efficiency even when there is decreased an amount of a catalyst to be loaded onto a region where an amount of deposited soot is small, and the above problem concerning an amount of a noble metal for use as the catalyst can be solved. Specifically, there is provided a structure where an inlet plugged cell whose open end has a square shape in a cross section perpendicular to a central axis direction of the honeycomb filter is surrounded with eight outlet plugged cells. In addition, the present inventors have found that for the purpose of improving the regeneration efficiency of the honeycomb filter while inhibiting the generation of the cracks, the plurality of outlet plugged cells do not have to be arranged discontinuously from one another as described in Patent Document 3, and conversely, it is effective to continuously arrange the cells. Furthermore, the present inventors have found that in such a honeycomb filter, the high regeneration efficiency can be maintained, also when there is increased the amount of the catalyst to be loaded onto a region where the amount of the deposited soot is large and there is decreased the amount of the catalyst to be loaded onto the region where the amount of the deposited soot is small. Therefore, the present inventors have found that the above problems can simultaneously be solved by the honeycomb filter which satisfies all the abovementioned constitutions, and have completed the present invention. That is, according to the present invention, the following honeycomb filter is provided.

[1] A honeycomb filter including a honeycomb substrate having porous partition walls defining a plurality of cells which extend from an inflow end face as an end face on an exhaust gas inflow side to an outflow end face as an end face on an exhaust gas outflow side and which become through channels for a fluid; and plugging portions disposed in end portions of the plurality of cells on one of an inflow end face side and an outflow end face side, wherein the cells of part of the plurality of cells are inlet plugged cells whose end portions are closed by the plugging portions on the inflow end face side of the honeycomb substrate, and the residual cells among the plurality of cells are outlet plugged cells whose end portions are closed by the plugging portions on the outflow end face side of the honeycomb substrate, and the honeycomb filter further includes a catalyst which is loaded onto at least one of the surface of each of the partition walls defining the outlet plugged cells and an inner portion of each of pores of the partition walls, to purify the exhaust gas, wherein the plurality of cells are arranged so that a periphery of one of the inlet plugged cells is surrounded with eight of the outlet plugged cells in a cross section perpendicular to a central axis direction of the honeycomb substrate, a shape of an open end of each of the inlet plugged cells in the cross section is a square in which a length of one side is L1, the outlet plugged cells include square outlet plugged cells and rectangular outlet plugged cells, a shape of an open end of each of the square outlet plugged cells in the cross section is a square in which a length of one side is L2, and L2 is smaller than L1, and a shape of an open end of each of the rectangular outlet plugged cells in the cross section is a rectangle in which a length of a long side is L1 and a length of a short side is L2, and in each diagonal direction of the square in which the length of the one side is L1 in the cross section, four of the square outlet plugged cells are arranged adjacent to the inlet plugged cell, and in a linear direction perpendicular to each side of the square in which the length of the one side is L1 in the cross section, four of the rectangular outlet plugged cells are arranged so that the cells are adjacent to the inlet plugged cell and so that the long side of the rectangle in the cross section is parallel to one side of the square in which the length of the one side is L1 in the cross section, a partition wall thickness of the partition walls of the honeycomb substrate is defined as t, a distance from an intermediate point of the thickness of the partition wall defining one side of the open end of the square in which the length of the one side is L1 in the cross section of the honeycomb substrate to an intermediate point of the thickness of the partition wall defining a side facing the one side is defined as a partition wall center distance a, a distance from an intermediate point of the thickness of the partition wall defining a long side of the open end of the rectangle in the cross section of the honeycomb substrate to an intermediate point of the thickness of the partition wall defining a side facing the long side is defined as a partition wall center distance b, the partition wall center distance a, the partition wall center distance b and the partition wall thickness t satisfy the following equation (1), and an amount of the catalyst per unit volume of the partition walls which is loaded onto the partition walls defining the rectangular outlet plugged cells and the inlet plugged cells is larger than an amount of the catalyst per unit volume of the partition walls which is loaded onto the partition walls defining the rectangular outlet plugged cells and the square outlet plugged cells, $$0.95 < b/at < 1.90 \tag{1}.$$

[2] The honeycomb filter according to the above [1], wherein the partition wall defining the rectangular outlet plugged cell and the inlet plugged cell has a high noble metal loading region where a large amount of a noble metal as the catalyst is loaded, and the partition wall defining the rectangular outlet plugged cell and the square outlet plugged cell has a low noble metal loading region where a smaller amount of the noble metal is loaded than in the high noble metal loading region.

[3] The honeycomb filter according to the above [1] or [2], wherein the partition wall center distance a is 1.4 mm or more and 2.4 mm or less.

[4] The honeycomb filter according to any one of the above [1] to [3], wherein the partition wall center distance b is 0.22 mm or more and 1.08 mm or less.

[5] The honeycomb filter according to any one of the above [1] to [4], wherein the partition wall thickness t is 0.16 mm or more and 0.34 mm or less.

[6] The honeycomb filter according to any one of the above [1] to [5], wherein a cell density of the honeycomb substrate is from 100 to 650 cells/cm$^2$.

[7] The honeycomb filter according to any one of the above [1] to [6], wherein an open frontal area of the outlet plugged cells on the inflow end face side is from 13 to 50%.

[8] The honeycomb filter according to any one of the above [1] to [7], wherein a porosity of the partition walls is from 28 to 70%.

[9] The honeycomb filter according to any one of the above [1] to [8], wherein a catalyst amount on an inflow end portion side of the partition wall defining the outlet plugged cell is larger than a catalyst amount of an outflow end portion side of the partition wall defining the outlet plugged cell.

[10] The honeycomb filter according to any one of the above [1] to [9], wherein the catalyst is a catalyst including at least one selected from the group consisting of platinum, palladium, rhodium and ruthenium.

The honeycomb filter of the present invention is capable of efficiently trapping and removing particulate matter included in an exhaust gas emitted from a direct injection type gasoline engine or a diesel engine, and reducing pressure loss in an initial stage as well as during PM deposition. Furthermore, the honeycomb filter of the present invention is capable of effectively preventing generation of cracks due to concentration of thermal stress during PM burning, and the like. Additionally, heat during the PM burning is easily propagated among a plurality of inflow side cells (outlet plugged cells) and hence, regeneration of the honeycomb filter can efficiently be performed. In addition, the honeycomb filter of the present invention has less plugging portions on an inflow end face side, a heat capacity on the inflow end face side of the honeycomb filter becomes smaller, ignitability during the PM burning improves, and continuous regeneration properties by NO$_2$ improve. Furthermore, an amount of a catalyst (especially, a noble metal) to be loaded onto the partition walls can be decreased while maintaining a high efficiency of regeneration to burn and remove soot deposited on the partition walls.

BRIEF DESCRIPTION OF THE DRAWINGS

FIG. 7 is a schematic partially enlarged view of a conventional honeycomb filter seen from an inflow end face side.

DESCRIPTION OF THE PREFERRED EMBODIMENTS

Hereinafter, embodiments of the present invention will be described with reference to the drawings. The present invention is not limited to the following embodiments, and changes, modifications and improvements can be added without departing from the gist of the invention.

Figure 1:
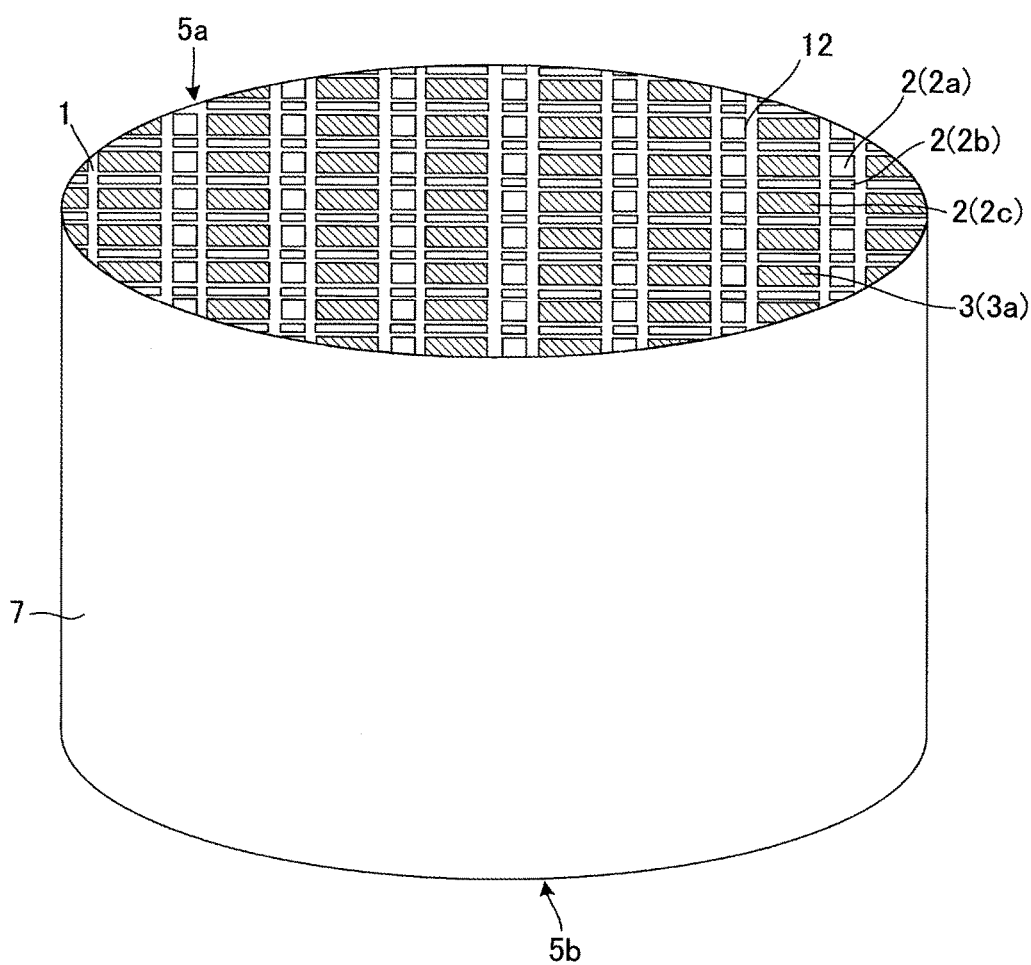
FIG. 1 is a perspective view schematically showing one embodiment of a honeycomb filter of the present invention.
Figure 2:
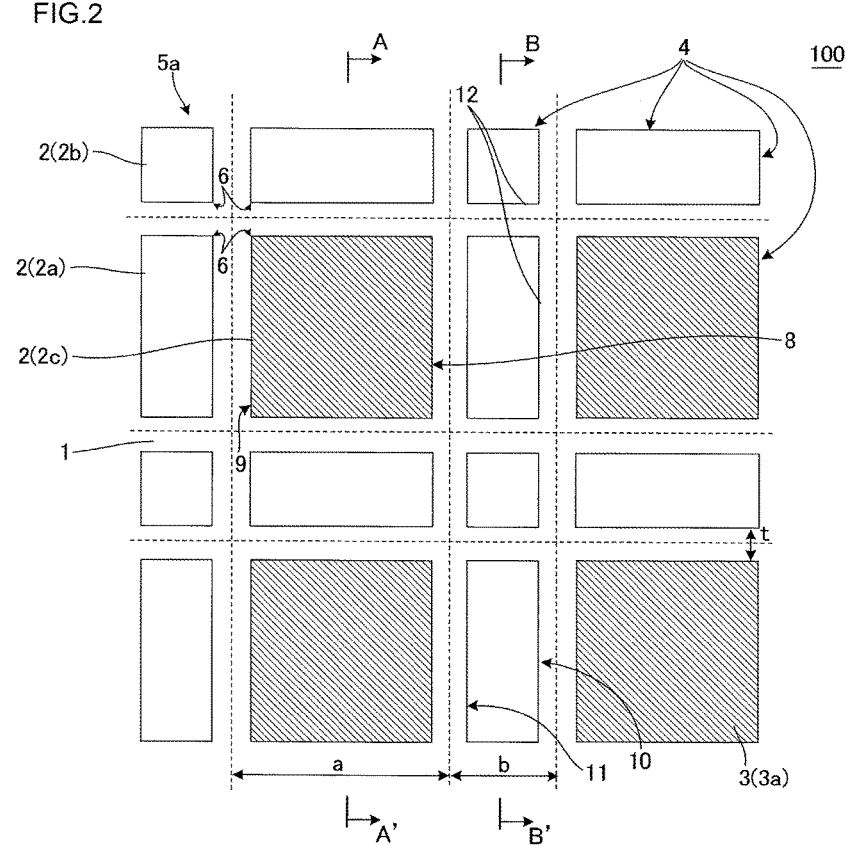
FIG. 2 is a partially enlarged view of the honeycomb filter shown in FIG. 1 and seen from an inflow end face side.
Figure 3:
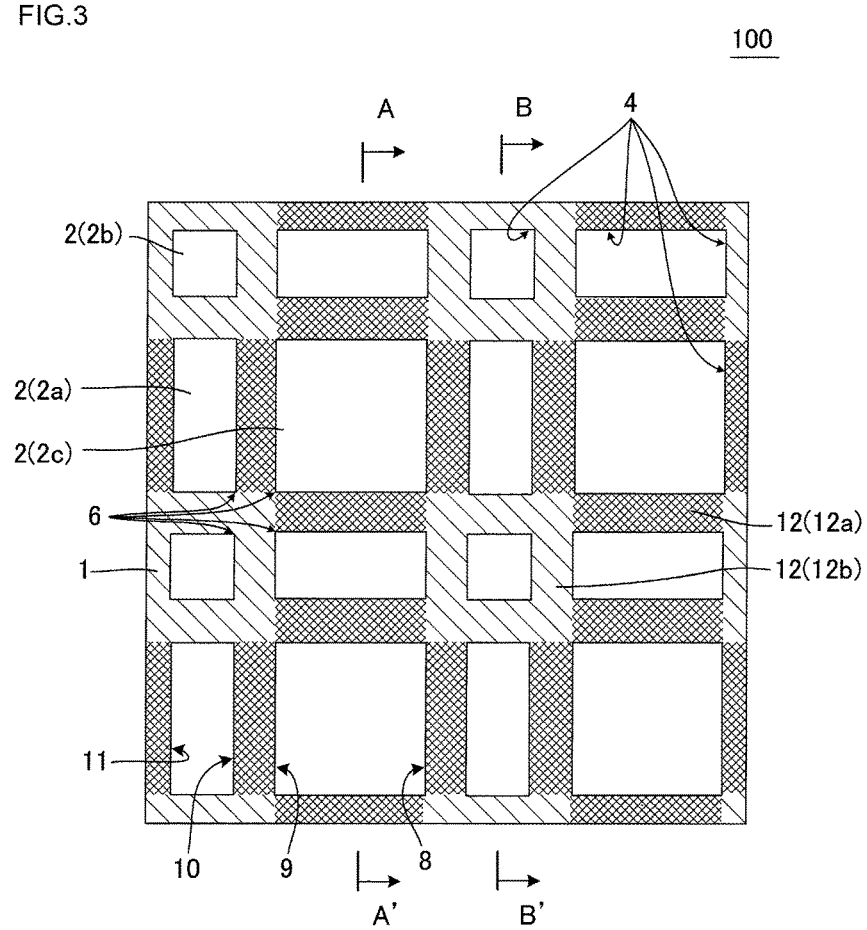
FIG. 3 is a partially enlarged view showing a cross section which is perpendicular to a cell extending direction of the honeycomb filter shown in FIG. 1.
Figure 4:
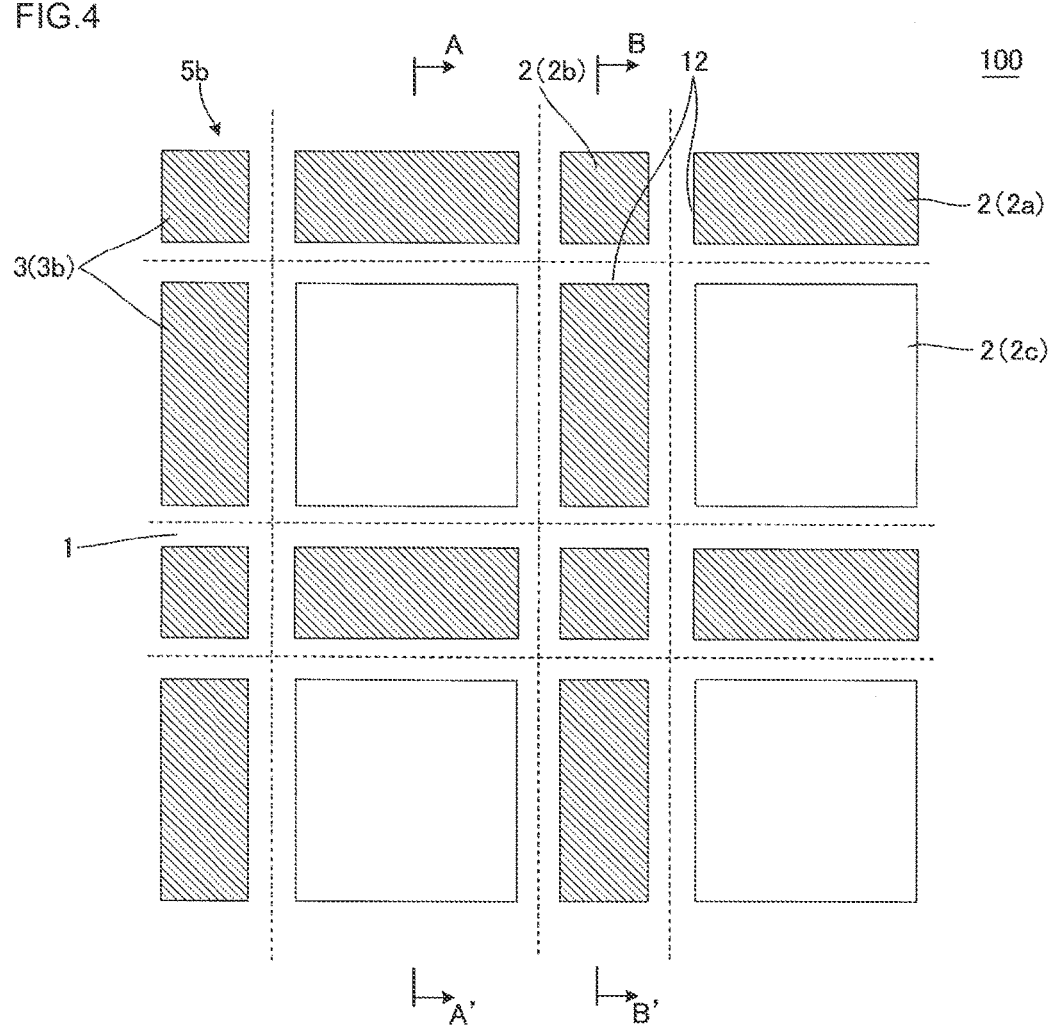
FIG. 4 is a partially enlarged view of the honeycomb filter shown in FIG. 1 and seen from an outflow end face side.
Figure 5:
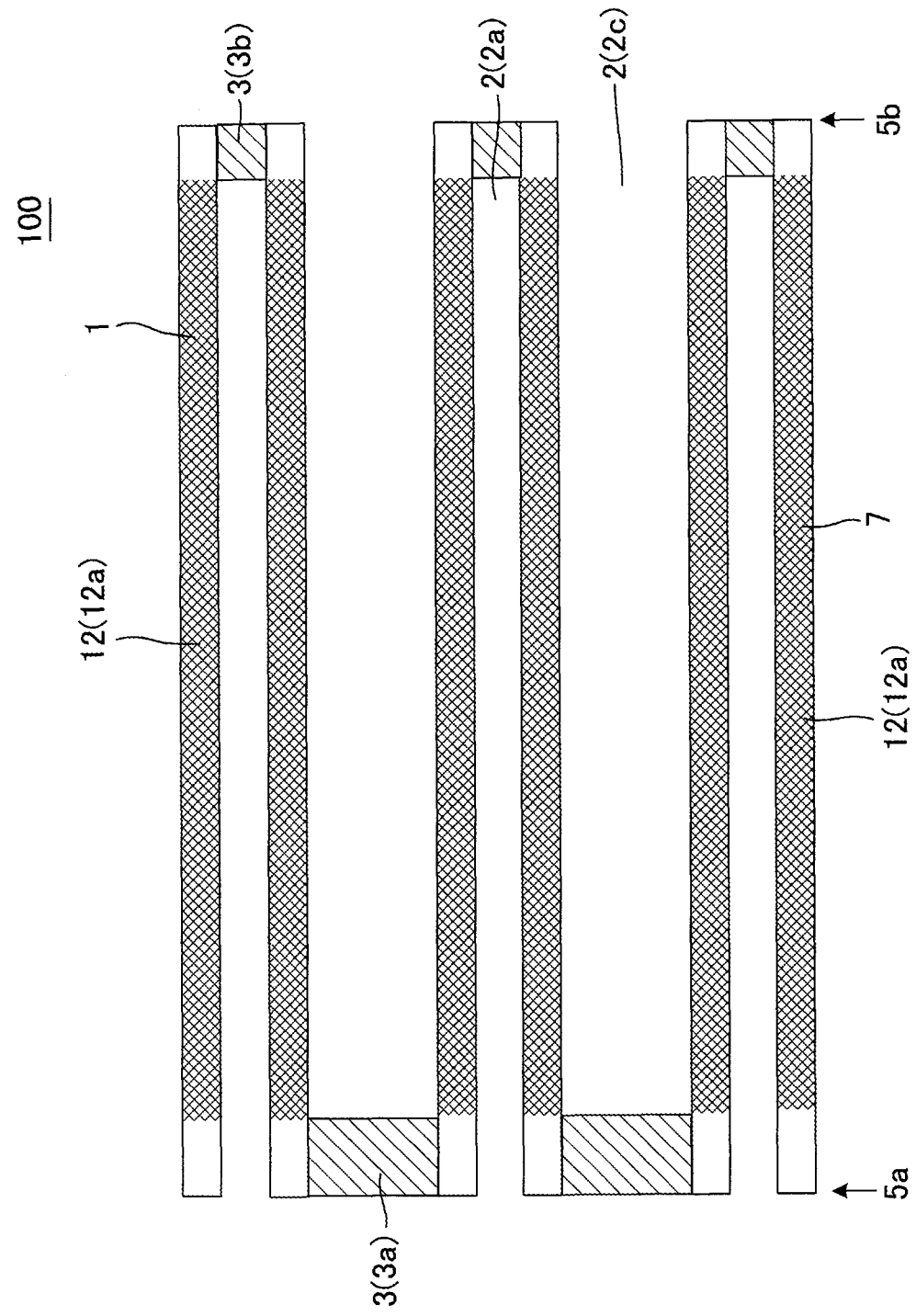
FIG. 5 is a view showing a cross section in an A-A' direction shown in FIG. 2.
Figure 6:
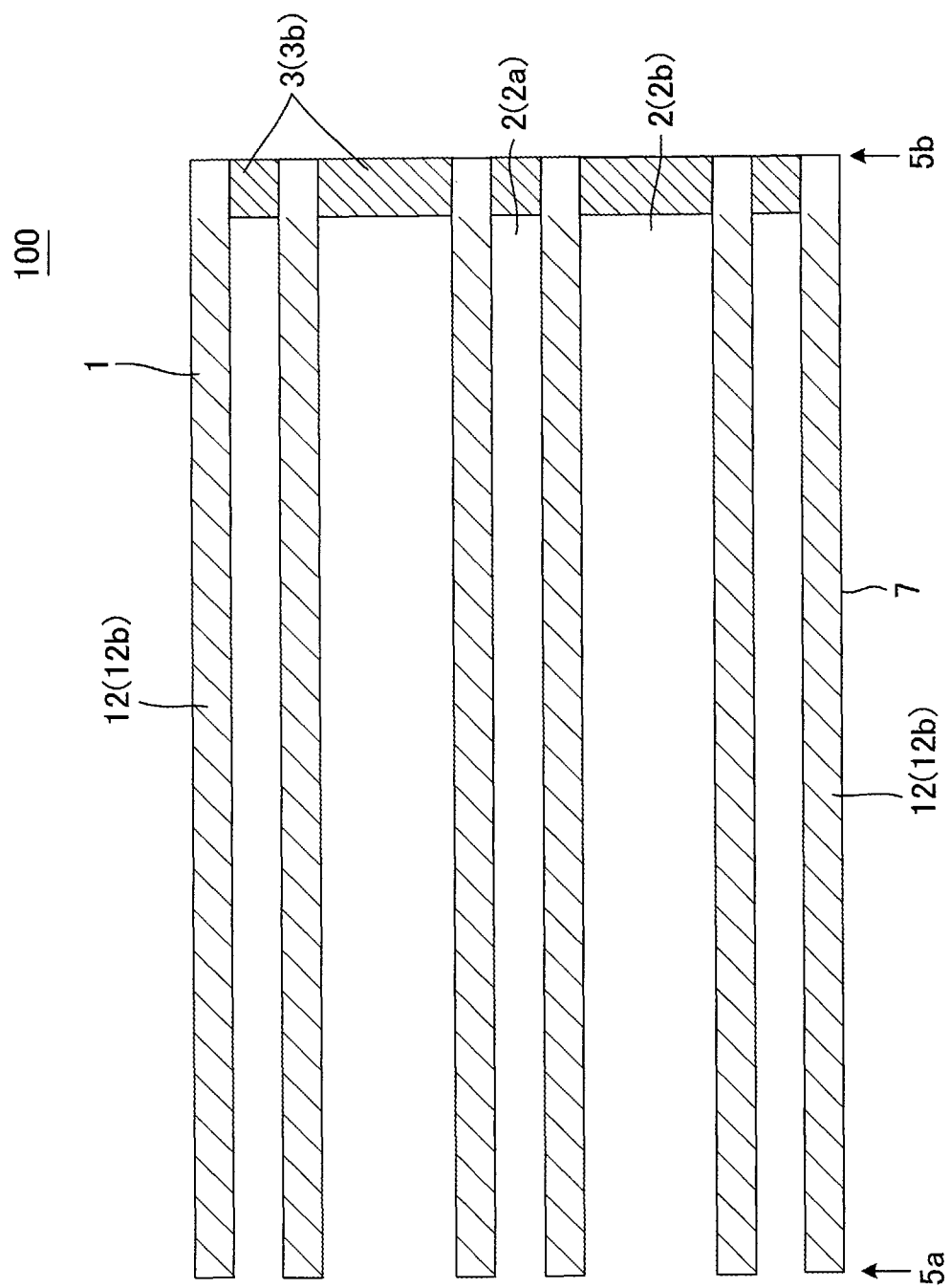
FIG. 6 is a view showing a cross section in an B-B' direction shown in FIG. 2.

A honeycomb filter of one embodiment of a honeycomb filter of the present invention is such a honeycomb filter 100 as shown in FIG. 1 to FIG. 6. The honeycomb filter 100 of the present embodiment includes a honeycomb substrate 7, plugging portions 3, and a catalyst 12 loaded onto partition walls 1 of the honeycomb substrate 7. The honeycomb substrate 7 has the porous partition walls 1 defining a plurality of cells 2 which extend through the honeycomb substrate from a first end face (an inflow end face 5a) to a second end face (an outflow end face 5b) and which become through channels for an exhaust gas. The plugging portions 3 are disposed in end portions of cells of part of the plurality of cells 2 on the side of the first end face (the inflow end face 5a) and end portions of the residual cells among the plurality of cells 2 on the side of the second end face (the outflow end face 5b). FIG. 1 is a schematic perspective view showing one embodiment of the honeycomb filter of the present invention. The catalyst 12 is a catalyst to purify the exhaust gas, and is loaded onto at least one of the surface of each of the partition walls 1 defining the cells 2 including the outflow end face 5b closed by the plugging portions 3 and an inner portion of each of pores of the partition walls. FIG. 2 is a partially enlarged view of the honeycomb filter shown in FIG. 1 and seen from the inflow end face side. FIG. 3 is a partially enlarged view showing a cross section which is perpendicular to a cell extending direction of the honeycomb filter shown in FIG. 1. It is to be noted that "the cell extending direction" is a central axis direction of the honeycomb filter (i.e., the honeycomb substrate). FIG. 4 is a partially enlarged view of the honeycomb filter shown in FIG. 1 and seen from the outflow end face side. FIG. 5 is a view showing a cross section (an A-A' cross section) in an A-A' direction shown in FIG. 2. FIG. 6 is a view showing a cross section (a B-B' cross section) in a B-B' direction shown in FIG. 2. It is to be noted that the A-A' cross sections and B-B' cross sections in FIG. 2 to FIG. 4 are the same cross sections.

As shown in FIG. 1 to FIG. 6, the plurality of cells 2 are constituted of rectangular outlet plugged cells 2a, square outlet plugged cells 2b and inlet plugged cells 2c. The rectangular outlet plugged cells 2a and the square outlet plugged cells 2b are the cells 2 which are opened in the inflow end face 5a for a fluid and in which outflow side plugging portions 3b are disposed in end portions on the side of the outflow end face 5b for the fluid. The inlet plugged cells 2c are the cells 2 in which inflow side plugging portions 3a are disposed in end portions on the side of the inflow end face 5a and which are opened in the outflow end face 5b.

As shown in FIG. 1 to FIG. 6, in the honeycomb filter 100 of the present embodiment, the plurality of cells 2 are arranged so that a periphery of one of the inlet plugged cells 2c is surrounded with eight outlet plugged cells in a cross section perpendicular to a central axis direction of the honeycomb substrate 7. A shape of an open end of each of the inlet plugged cells 2c in the cross section is a square in which a length of one side is L1 (hereinafter referred to also as "the length L1"). The outlet plugged cells include the square outlet plugged cells 2b and rectangular outlet plugged cells 2a. A shape of an open end of each of the square outlet plugged cells 2b in the cross section is a square in which a length of one side is L2 (hereinafter referred to also as "the length L2"), and the length L2 is smaller than the length L1. In addition, a shape of an open end of each of the rectangular outlet plugged cells 2a in the cross section is a rectangle in which a length of a long side is L1 and a length of a short side is L2. Additionally, in the honeycomb filter 100 of the present embodiment, four of the square outlet plugged cells 2b are arranged adjacent to the inlet plugged cell 2c in each diagonal direction of the square in which the length of the one side is L1 in the cross section. Further, in a linear direction perpendicular to each side of the square in which the length of the one side is L1 in the cross section, four of the rectangular outlet plugged cells 2a are adjacent to the inlet plugged cell 2c. In this case, the cells are arranged so that the long side of the rectangle of the rectangular outlet plugged cell 2a in the cross section is parallel to one side of the inlet plugged cell 2c in the cross section (one side of the square in which the length of the one side is L1). Here, a partition wall thickness of the porous partition walls 1 is defined as t, and a distance from an intermediate point of the thickness of the partition wall 1 defining one side of the open end of the square in which the length of the one side is L1 in the cross section to an intermediate point of the thickness of the partition wall 1 defining a side facing the one side is defined as a partition wall center distance a. In addition, a distance from an intermediate point of the thickness of the partition wall 1 defining a long side of the open end of the rectangle in the cross section to an intermediate point of the thickness of the partition wall 1 defining a side facing the long side is defined as a partition wall center distance b. Further, in the honeycomb filter 100 of the present embodiment, the partition wall center distance a, the partition wall center distance b and the partition wall thickness t satisfy the following equation (1):

$$0.95 < b/at < 1.90 \quad (1).$$

It is to be noted that, in the honeycomb filter 100, the partition wall center distance a, the partition wall center distance b and the partition wall thickness t do not include a thickness of a layer formed by the catalyst 12 (hereinafter referred to as a catalyst layer sometimes) in a case where the catalyst 12 is loaded onto the surface of the partition wall 1.

Furthermore, in the honeycomb filter 100 of the present embodiment, an amount of the catalyst 12 to be loaded onto the partition wall 1 partially differs as shown in FIG. 3, FIG. 5 and FIG. 6. Specifically, an amount of a catalyst 12a loaded onto the partition wall 1 defining the rectangular outlet plugged cell 2a and the inlet plugged cell 2c is larger than an amount of a catalyst 12b loaded onto the partition wall 1 defining the rectangular outlet plugged cell 2a and the square outlet plugged cell 2b. The catalyst 12a loaded onto the partition walls 1 defining the rectangular outlet plugged cells 2a and the inlet plugged cells 2c is mainly loaded onto the surfaces of the partition walls 1 defining the rectangular outlet plugged cells 2a and inner portions of pores of the partition walls 1. In addition, the catalyst 12b loaded onto the partition walls 1 defining the rectangular outlet plugged cells 2a and the square outlet plugged cells 2b is mainly loaded onto the surfaces of the partition walls 1 defining the square outlet plugged cells 2b and the inner portions of the pores of the partition walls 1. Additionally, an amount of the catalyst per unit volume of the partition walls 1 which is loaded onto a portion in which the partition walls 1 intersect each other (i.e., an intersecting portion of the partition walls 1) is preferably smaller than an amount of the catalyst 12a per unit volume of the partition walls 1 which is loaded onto the partition walls 1 defining the rectangular outlet plugged cells 2a and the inlet plugged cells 2c. Hereinafter, "the amount of the catalyst per unit volume of the partition walls 1" will simply be referred to as "the amount of the catalyst" or "the catalyst amount" sometimes. In addition, "per unit volume of the partition walls" will be referred to as "per partition wall unit volume" sometimes.

The honeycomb filter 100 of the present embodiment shown in FIG. 1 to FIG. 6 has such a constitution as described above, and hence, the honeycomb filter produces the effects that a trapping efficiency of particulate matter in the exhaust gas is high and pressure losses in an initial stage of use and during deposition of the particulate matter are low and that the honeycomb filter is excellent in heat resistance strength and can efficiently be regenerated. Additionally, in the honeycomb filter 100 of the present embodiment, an amount of the catalyst 12 to be loaded onto a region where a large amount of soot is deposited is large, so that effective utilization ratio of the catalyst 12 in burning the soot improves and a high regeneration efficiency can be realized while relatively decreasing the amount of the catalyst 12 to be loaded. In particular, when the catalyst 12 includes a noble metal, an amount of the noble metal to be used as the catalyst 12 can be decreased, and manufacturing cost increase due to the catalyst 12 can effectively be suppressed.

In the honeycomb filter 100 of the present embodiment, reasons why the effective utilization ratio of the catalyst 12 improves are as follows. When the honeycomb filter 100 is used as a filter for the exhaust gas purification, a large amount of the PM (e.g., the soot) is deposited on the partition walls 1 defining the rectangular outlet plugged cells 2a and the inlet plugged cells 2c. On the other hand, a relatively smaller amount of the PM (e.g., the soot) is deposited on the partition walls 1 defining the rectangular outlet plugged cells 2a and the square outlet plugged cells 2b. Therefore, even when the amount of the catalyst 12b loaded onto the partition walls 1 defining the rectangular outlet plugged cells 2a and the square outlet plugged cells 2b is decreased, deterioration of the regeneration efficiency of the honeycomb filter 100 can be inhibited.

Additionally, in the honeycomb filter 100 of the present embodiment, such an effect as described below (an unexpected effect 1) is produced concerning the effect that the effective utilization ratio of the catalyst 12 improves. That is, in the honeycomb filter 100 of the present embodiment, the rectangular outlet plugged cells 2a and the square outlet plugged cells 2b are linearly arranged. Consequently, there is produced the remarkable effect that the partition walls 1 defining the rectangular outlet plugged cells 2a easily transmit burning heat during the burning of the soot to the adjacent square outlet plugged cells 2b and the soot can efficiently be burnt. For example, in a constitution where plugging portions are arranged in a checkered manner as in a conventional honeycomb filter, mutual continuity of the cells which are opened on an inlet side is poor, and the heat by the burning of the soot is hard to be transmitted to the other adjacent cells, so that the regeneration of the filter cannot sufficiently efficiently be performed.

Furthermore, in the honeycomb filter 100 of the present embodiment, such an effect as described below (an unexpected effect 2) is produced concerning the effect that the effective utilization ratio of the catalyst 12 improves. That is, in the constitution where the plugging portions are arranged in the checkered manner as in the conventional honeycomb filter, temperature rise of the inflow end face due to the exhaust gas becomes dull, and continuous regeneration properties by $NO_2$ worsen in a certain case. In the honeycomb filter 100 of the present embodiment, an amount of the plugging portions 3 to be arranged on the inflow end face 5a side becomes smaller, so that a heat capacity on the inflow end face 5a side lowers, and ignitability (burnability) of the soot improves. Therefore, the honeycomb filter 100 of the present embodiment produces the remarkable effect that the continuous regeneration properties by $NO_2$ improve.

In the present embodiment, there is not any special restriction on a material constituting the honeycomb substrate 7. From the viewpoints of strength, heat resistance, durability and the like, main components of the material constituting the honeycomb substrate 7 are preferably various ceramics of oxides or non-oxides, metals and the like. It is considered that examples of the ceramics include cordierite, mullite, alumina, spinel, silicon carbide, silicon nitride and aluminum titanate. In addition, it is considered that examples of the metal include an Fe—Cr—Al series metal and metal silicon. At least one or at least two selected from the group consisting of these materials is preferably the main component of the material constituting the honeycomb substrate 7. From the viewpoints of high strength, high heat resistance and the like, at least one or at least two selected from the group consisting of alumina, mullite, aluminum titanate, cordierite, silicon carbide and silicon nitride is especially preferably the main component of the material constituting the honeycomb substrate 7. In addition, from the viewpoints of high thermal conductivity, high heat resistance and the like, silicon carbide or a silicon-silicon carbide composite material is especially suitable as the main component of the material constituting the honeycomb substrate 7. Here, "the main component" means that a mass ratio of the component in a mass of the honeycomb substrate 7 is 50 mass % or more, preferably 70 mass % or more and further preferably 80 mass % or more.

In addition, a porosity of the partition walls 1 of the honeycomb substrate 7 is preferably from 28 to 70%, further preferably from 30 to 70%, and especially preferably from 35 to 68%. It is to be noted that the porosity of the partition walls is a value measured by mercury porosimetry.

In the present embodiment, there is not any special restriction on a material of the plugging portions 3 as well. The material of the plugging portions 3 preferably includes at least one or at least two selected from the group consisting of various ceramics, metals and the like that are the abovementioned preferable examples of the material of the honeycomb substrate 7.

In addition, a porosity of the plugging portions 3 is preferably from 28 to 70%, further preferably from 30 to 70%, and especially preferably from 35 to 68%. When thermal expansion during PM burning is taken into consideration, in the honeycomb substrate 7, each of the porosity of the partition walls 1 and the porosity of the plugging portions 3 is preferably from 35 to 68%. It is to be noted that the porosity of the plugging portions is a value measured by the mercury porosimetry.

A cell density of the honeycomb filter 100 (the number of the cells 2 per unit volume in a cross section perpendicular to a central axis of the honeycomb filter 100) is preferably from 100 to 650 cells/cm$^2$, further preferably from 200 to 650 cells/cm$^2$, and especially preferably from 300 to 600 cells/cm$^2$. When the cell density is smaller than 100 cells/cm$^2$, a trapping performance deteriorates in a certain case. When the cell density is larger than 650 cells/cm$^2$, the PM is deposited in the vicinity of the inflow end face 5a of the honeycomb filter 100, and the cells 2 are gradually closed by the PM, so that pressure loss enlarges in a certain case.

In addition, although not shown in the drawings, the honeycomb substrate constituting the honeycomb filter may be a honeycomb substrate of a segmented structure. Specifically, an example of the honeycomb substrate of the segmented structure is a honeycomb substrate in which a plurality of honeycomb segments are bonded in a state where the honeycomb segments are arranged adjacent to each other so that side surfaces of the honeycomb segments face each other. Each honeycomb segment has porous partition walls defining a plurality of cells which extend from an inflow end face to an outflow end face and become through channels for a fluid, and an outer wall disposed to surround the partition walls. A circumferential wall is disposed in an outermost circumference of a bonded body in which the plurality of honeycomb segments are bonded. In addition, a circumferential portion of the bonded body in which the plurality of honeycomb segments are bonded is processed by grinding or the like, and a cross section perpendicular to a cell extending direction is formed into a round shape or the like. Afterward, the circumferential wall may be disposed by applying a ceramic material to the outermost circumference. Such a so-called honeycomb substrate of the segmented structure is usable in place of a so-called monolithic honeycomb substrate shown in FIG. 1. Additionally, for the honeycomb substrate constituting the honeycomb filter, slits may be formed in a part of the honeycomb substrate. In the honeycomb substrate of the segmented structure or the honeycomb filter in which the honeycomb substrate formed with the slits is used, thermal stress to be applied to the filter can be dispersed, and generation of cracks due to local temperature rise can be prevented.

There is not any special restriction on a size or a shape of each segment in a case where the plurality of honeycomb segments are integrated. However, when each segment is excessively large, a crack preventing effect by segmentation cannot sufficiently be exerted, and when each segment is excessively small, manufacturing of each segment or the integration by the bonding becomes laborious in a certain case. There is not any special restriction on the shape of such a honeycomb segment, and for example, a quadrangular sectional shape, i.e., a quadrangular pillar-shaped segment is defined as a basic shape, and a circumferential shape of the monolithic honeycomb filter can appropriately be selected and processed.

There is not any special restriction on the whole shape of the honeycomb filter of the present embodiment, and in addition to such a round sectional shape as shown in FIG. 1, examples of the sectional shape include substantially round shapes such as an elliptic shape, a race track shape and an oblong shape and polygonal shapes such as a quadrangular shape and a hexagonal shape.

The honeycomb filter of the present embodiment will be described in more detail with reference to the drawings. As shown in FIG. 2 and FIG. 4, in the honeycomb filter 100 of the present embodiment, the shape of the open end of each of the inlet plugged cells 2c in the cross section perpendicular to the central axis direction of the honeycomb substrate 7 is the square in which the length of one side is L1. Additionally, as shown in FIG. 2 and FIG. 4, in the honeycomb filter 100 of the present embodiment, the shape of the open end of each of the square outlet plugged cells 2b in the cross section perpendicular to the central axis direction of the honeycomb substrate 7 is the square in which the length of one side is L2, and L2 is smaller than L1. In addition, as shown in FIG. 2 and FIG. 4, the shape of the open end of each of the rectangular outlet plugged cells 2a in the cross section perpendicular to the central axis of the honeycomb substrate 7 is a rectangle in which a length of a long side is L1 and a length of a short side is L2. FIG. 7 is a schematic partially enlarged view of a conventional honeycomb filter seen from an inflow end face side. In a honeycomb filter 200 shown in FIG. 7, inlet plugged cells 202b and 202c and outlet plugged cells 202a are arranged in a checkered manner. It is to be noted that, in FIG. 7, reference numeral 201 indicates a partition wall. In FIG. 7, reference numeral 202 indicates a cell. In FIG. 7, reference numeral 203 indicates a plugging portion. In FIG. 7, reference numeral 205a indicates an inflow end face. On the other hand, as shown in FIG. 1 to FIG. 6, the honeycomb filter 100 of the present embodiment has the constitution where the inlet plugged cell 2c is surrounded with four square outlet plugged cells 2b and four rectangular outlet plugged cells 2a. Consequently, in the honeycomb filter 100 of the present embodiment, the pressure losses in the initial stage of the use of the honeycomb filter and during the PM deposition can be reduced as compared with the conventional honeycomb filter 200 shown in FIG. 7. Here, "the sectional shape" is the shape in the cross section when the cells 2 of the honeycomb filter 100 shown in FIG. 1 to FIG. 6 are cut along a plane perpendicular to the central axis direction of the cells, and indicates the shape of each of portions surrounded with the partition walls 1 forming the cells 2. Additionally, in the square and the rectangle mentioned in the present specification, four corner portions of each of the square and the rectangle may form vertexes. In addition, four corner portions 6 of each of the square and the rectangle may be formed into a curved shape. When each of the corner portions 6 is formed into the curved shape, a curvature radius is preferably 0.4 mm or less. Here, the corner portion 6 having a curvature radius of 0 mm is defined as the vertex.

Additionally, as shown in FIG. 2 and FIG. 4, in the honeycomb filter 100 of the present embodiment, the plurality of cells 2 are arranged so that the periphery of one of the inlet plugged cells 2c is surrounded with eight outlet plugged cells in the cross section perpendicular to the central axis direction of the honeycomb substrate 7. Here, the abovementioned eight outlet plugged cells are constituted of four square outlet plugged cells 2b and four rectangular outlet plugged cells 2a. Further, the cells are arranged so that each of four sides of the inlet plugged cell 2c having the square sectional shape in which the length of one side is L1 is adjacent to the long side of the rectangular outlet plugged cell 2a having the rectangular sectional shape in which the length of the long side is L1 and the length of the short side is L2 and so that the adjacent sides are parallel to each other. Additionally, in each diagonal direction of the inlet plugged cell 2c having the square section shape in which the length of the one side is L1, four square outlet plugged cells 2b each having the square section shape in which the length of one side is L2 are arranged adjacent to the inlet plugged cell 2c. In such a structure, the inlet plugged cells 2c are not adjacent to each other, but the inlet plugged cell 2c is surrounded with four square outlet plugged cells 2b and four rectangular outlet plugged cells 2a. According to such a structure, an open frontal area of the inlet plugged cell 2c can be enlarged, and the number of the inlet plugged cells 2c can be smaller than the total number of the rectangular outlet plugged cells 2a and the square outlet plugged cells 2b, so that the initial pressure loss can be reduced.

In addition, as shown in FIG. 2 and FIG. 4, in a portion in which the vertexes of each of four cells 2 gather, i.e., a portion in which the four vertexes (the corner portions 6) gather, the two partition walls 1 are perpendicular to each other. It is to be noted that "the portion in which the four vertexes gather" is a portion in which one of the vertexes of the one inlet plugged cell 2c, one of the vertexes of the square outlet plugged cell 2b adjacent to the one inlet plugged cell 2c and one of the vertexes of each of the two rectangular outlet plugged cells 2a adjacent to the one inlet plugged cell 2c gather. According to such a structure, a high heat capacity of the partition walls 1 can be maintained, and it is possible to alleviate the thermal stress during the PM burning in the vertex portion on which the PM is easily deposited.

A distance between the partition wall 1 forming a first side 8 of the inlet plugged cell 2c and the partition wall 1 forming a second side 9 facing the first side 8 of the inlet plugged cell 2c is defined as a partition wall center distance a. The partition wall center distance a is preferably in a range of 1.4 mm or more and 2.4 mm or less, further preferably in a range of 1.4 mm or more and 2.2 mm or less, and especially preferably in a range of 1.4 mm or more and 2.0 mm or less. Here, the partition wall center distance a indicates the shortest distance that connects a center of a thickness direction of the partition wall 1 forming the first side 8 of the inlet plugged cell 2c to a center of a thickness direction of the partition wall 1 forming the facing second side 9 of the inlet plugged cell 2c. In addition, a distance between the partition wall 1 constituting a first long side 10 of the rectangular outlet plugged cell 2a and the partition wall 1 forming a second long side 11 facing the first long side 10 of the rectangular outlet plugged cell 2a is defined as a partition wall center distance b. The partition wall center distance b is preferably in a range of 0.22 mm or more and 1.08 mm or less, further preferably in a range of 0.5 mm or more and 1.08 mm or less, and especially preferably in a range of 0.8 mm or more and 1.08 mm or less. Here, the partition wall center distance b indicates the shortest distance that connects a center of a thickness direction of the partition wall 1 forming the first long side 10 of the rectangular outlet plugged cell 2a to a center of a thickness direction of the partition wall 1 forming the facing second long side 11 of the rectangular outlet plugged cell 2a. A relation between the partition wall center distance a and the partition wall center distance b is in the above range, whereby the initial pressure loss and the pressure loss during the PM deposition are reduced with good balance. It is to be noted that each of the partition wall center distances a and b is a value measured by a method in which the cross section in the direction perpendicular to the central axis direction of the honeycomb substrate 7 is observed with an optical microscope.

The thickness t of the partition walls 1 is preferably from 0.16 to 0.58 mm and further preferably from 0.16 to 0.40 mm. When the thickness t of the partition walls 1 is smaller than 0.16 mm, the strength of the honeycomb substrate 7 deteriorates in a certain case. When the thickness t of the partition walls 1 is larger than 0.58 mm, the trapping performance deteriorates and the pressure loss enlarges in a certain case. It is to be noted that the thickness t of the partition walls is a value measured by the method in which the cross section in the direction perpendicular to the axial direction of the honeycomb substrate 7 is observed with the optical microscope.

According to the definitions of the respective partition wall center distances, the partition wall center distances a and b are "L1+t" and "L2+t", respectively. As inner surface areas of the square outlet plugged cells 2b and the rectangular outlet plugged cells 2a become larger, an area in which the PM is deposited enlarges, and a thickness of the deposited PM during the PM deposition becomes smaller, so that the pressure loss during the PM deposition can be reduced. On the other hand, when the inner surface areas of the square outlet plugged cells 2b and the rectangular outlet plugged cells 2a are excessively large, the pressure loss during the PM deposition can be reduced, but the initial pressure loss disadvantageously enlarges. In addition, as the partition wall thickness t becomes smaller, the initial pressure loss and the pressure loss during the PM deposition decrease, but when the partition wall thickness t is excessively small, the heat capacity of the honeycomb substrate excessively becomes small. In consequence, when the PM is burnt and removed, a temperature of the honeycomb substrate excessively heightens, and the filter is damaged due to the excessively large thermal stress in a certain case.

To satisfy both requirements, i.e., the reduction of the initial pressure loss and the pressure loss during the PM deposition and the prevention of the damage during the honeycomb filter regeneration, it is important that a value b/at obtained by dividing a product of the partition wall center distance a and the partition wall thickness t by the partition wall center distance b is larger than 0.95 and smaller than 1.90. The abovementioned "b/at" is further preferably larger than 1.20 and smaller than 1.90 and especially preferably larger than 1.40 and smaller than 1.90.

In the honeycomb filter of the present embodiment, the amount of the catalyst loaded onto the partition wall defining the rectangular outlet plugged cell and the inlet plugged cell is larger than the amount of the catalyst loaded onto the partition wall defining the rectangular outlet plugged cell and the square outlet plugged cell. Hereinafter, the partition wall defining the rectangular outlet plugged cell and the inlet plugged cell will be called "a first partition wall" and the partition wall defining the rectangular outlet plugged cell and the square outlet plugged cell will be called "a second partition wall" sometimes. The amount of the catalyst to be loaded per partition wall volume of the first partition wall is preferably from 1.05 to 2 times, further preferably from 1.1 to 1.8 times and especially preferably from 1.2 to 1.6 times as large as the amount of the catalyst to be loaded per partition wall volume of the second partition wall. According to such a constitution, the amount of the catalyst (especially, the noble metal) to be loaded onto the partition walls can be decreased while maintaining the high regeneration efficiency in burning and removing the soot deposited on the partition walls.

Additionally, in the honeycomb filter of the present embodiment, the first partition wall may have a high catalyst loading region where a large amount of the catalyst is loaded, and the second partition wall may have a low catalyst loading region where a smaller amount of the catalyst is loaded than in the above high catalyst loading region. As described above, in the honeycomb filter of the present embodiment, a relatively large amount of the catalyst may be loaded onto the region of at least a part of the first partition wall, and a relatively smaller amount of the catalyst may be loaded onto the region of at least a part of the second partition wall. Also in this constitution, the amount of the catalyst (especially, the noble metal) to be loaded onto the partition walls can be decreased while maintaining the high regeneration efficiency in burning and removing the soot deposited on the partition walls.

Furthermore, in the honeycomb filter of the present embodiment, the first partition wall may have a high noble metal loading region where a large amount of the noble metal as the catalyst is loaded, and the second partition wall may have a low noble metal loading region where a smaller amount of the noble metal is loaded than in the above high noble metal loading region. As described above, in the honeycomb filter of the present embodiment, a relatively large amount of the noble metal as the catalyst may be loaded onto a region of at least a part of the first partition wall, and a relatively small amount of the noble metal as the catalyst may be loaded onto a region of at least a part of the second partition wall. Also in this constitution, the amount of the noble metal to be loaded onto the partition walls can be decreased while maintaining the high regeneration efficiency in burning and removing the soot deposited on the partition walls.

The amount of the catalyst to be loaded onto the first partition wall and the second partition wall can be measured by the following method. First, the first partition wall and the second partition wall are cut out from the honeycomb filter, respectively. Afterward, partition wall pieces of the cut-out first partition wall and second partition wall are embedded in a resin, and after the resin embedding, end faces of the respective partition wall pieces are polished. Each polished face is photographed by SEM, and concerning the photographed image, void, partition wall substrate and catalyst regions are identified by image processing and an area ratio of the regions is obtained. From the obtained area ratio, the amounts of the catalyst loaded onto the first partition wall and the second partition wall are obtained.

In addition, the amounts of the noble metal in the first partition wall and the second partition wall can be measured by the following method. First, the first partition wall and the second partition wall are cut out from the honeycomb filter, respectively. Afterward, the partition wall pieces of the cut-out first partition wall and second partition wall are embedded in the resin, and after the resin embedding, the respective end faces of the partition wall pieces are polished. Each polished face is SEM-photographed by the SEM, and concerning the photographed image, the void, partition wall substrate and catalyst regions are identified by the image processing and the area ratio of the regions is obtained. Additionally and simultaneously, a concentration of the noble metal of the catalyst is measured by element concentration analysis (EDS). From the obtained area ratio in the region of the catalyst and the obtained noble metal concentration of the catalyst, the amounts of the noble metal in the first partition wall and the second partition wall are obtained.

In the honeycomb filter of the present embodiment, the amount of the catalyst to be loaded onto the first partition walls may be larger than the amount of the catalyst to be loaded onto the second partition walls in all regions in the cell extending direction of the honeycomb substrate. Additionally, in the honeycomb filter of the present embodiment, the amount of the catalyst to be loaded onto the first partition walls may be larger than the amount of the catalyst to be loaded onto the second partition walls in a part of the cell extending direction of the honeycomb substrate. In any of the abovementioned cases, the amount of the catalyst to be loaded onto the partition walls (especially, the noble metal included in the catalyst) can be decreased.

In addition, although not shown in the drawings, in the honeycomb filter of the present embodiment, the amount of the catalyst on an inflow end portion side of the partition wall defining the outlet plugged cell may be larger than the amount of the catalyst on an outflow end portion side of the partition wall defining the outlet plugged cell. As described above, in the honeycomb filter of the present embodiment, the amount of the catalyst to be loaded onto the partition walls may vary in the cell extending direction of the honeycomb substrate.

There is not any special restriction on the catalyst to be loaded onto the partition walls, and a known exhaust gas purifying catalyst for use in the purification of the exhaust gas is preferably usable. An example of the catalyst is an oxidation catalyst to burn and remove the soot included in the exhaust gas. In addition, examples of types of catalyst include SCR catalysts (zeolite, titania and vanadium), and a three-way catalyst including at least two of noble metals such as Pt, Rh and Pd and at least one of alumina, ceria and zirconia. When such a catalyst is loaded, NOx, CO, HC and the like included in the exhaust gas emitted from a direct injection type gasoline engine, a diesel engine or the like are detoxified, and the PM deposited on the surfaces of the partition walls can easily be burnt and removed by a catalytic action.

The catalyst to be loaded onto the first partition walls and the catalyst to be loaded onto the second partition walls are preferably the same type of catalyst. That is, in the honeycomb filter of the present embodiment, the amount of the catalyst to be loaded preferably only differs with the first partition walls and the second partition walls. A preferable example of the catalyst is a catalyst including at least one selected from the group consisting of platinum, palladium, rhodium and ruthenium. There is not any special restriction on the amount of the catalyst to be loaded, as long as the amount of the catalyst to be loaded onto the first partition walls is larger than the amount of the catalyst to be loaded onto the second partition walls. For example, as the catalyst including platinum, the amount of the catalyst to be loaded onto the first partition walls is preferably from about 0.2 to 3 g/L.

There is not any special restriction on a manufacturing method of the honeycomb filter 100 of the present embodiment. For example, the honeycomb filter 100 can be manufactured by the following method. A material selected from the abovementioned preferable materials, e.g., silicon carbide (SiC) powder is used as raw material powder of the honeycomb substrate 7, and a binder is added to this material. Furthermore, a surfactant and water are added, and a kneaded material having plasticity is prepared. Examples of the binder include methylcellulose and hydroxypropoxyl methylcellulose. This kneaded material is extruded to obtain a formed body of the honeycomb substrate 7 having the partition walls 1 and the cells 2 having such predetermined sectional shapes as described above. This body is dried by, for example, microwaves and hot air, and then, plugging is performed with a material similar to the material used in the extrusion of the honeycomb substrate 7, whereby the plugging portions 3 are disposed in the formed body of the honeycomb substrate 7. Further, the formed body of the honeycomb substrate 7 in which the plugging portions 3 are disposed is further dried, heated and degreased in, e.g., a nitrogen atmosphere, and then fired in an inert atmosphere of argon or the like, so that the honeycomb filter 100 of the present embodiment can be obtained. A firing temperature and a firing atmosphere differ with the raw material, and a person skilled in the art can select the firing temperature and firing atmosphere which are optimum for the selected material.

When the honeycomb filter 100 of the present embodiment is manufactured, the catalyst 12 is preferably loaded onto the honeycomb substrate 7 including the above-mentioned plugging portions 3 by the following method. First, a catalyst slurry containing the catalyst 12 is prepared. Afterward, the prepared catalyst slurry is sucked to flow into the outlet plugged cells 2a and 2b. An example of a method of allowing the catalyst slurry to flow into the outlet plugged cells 2a and 2b by the suction is such a method as described below. First, the catalyst slurry is stored in a container, and the inflow end face 5a side of the honeycomb substrate 7 including the plugging portions 3 is immersed into the catalyst slurry in the container. From the outflow end face 5b side of the honeycomb substrate 7, the catalyst slurry is sucked through the inlet plugged cells 2c, thereby allowing the catalyst slurry to flow into the outlet plugged cells 2a and 2b from the inflow end face 5a side of the honeycomb substrate 7. In this case, the square outlet plugged cells 2b and the rectangular outlet plugged cells 2a are present as the outlet plugged cells 2a and 2b in the honeycomb substrate 7, but more catalyst slurry is sucked from the rectangular outlet plugged cell 2a adjacent to the inlet plugged cell 2c via the first partition wall. As a result, a larger amount of the catalyst is loaded onto the first partition walls. On the other hand, the square outlet plugged cell 2b is exclusively adjacent to the rectangular outlet plugged cell 2a via the second partition wall, and hence, a suction force when sucking the inlet plugged cells 2c is hard to be transmitted. For example, an inside of the square outlet plugged cells 2b is only little sucked through the intersecting portions of the partition walls 1. In addition, under an influence of the suction of the inside of the rectangular outlet plugged cells 2a, the inside of the square outlet plugged cells 2b is sucked in a certain case. However, a suction amount in the square outlet plugged cell 2b is smaller than a suction amount in the rectangular outlet plugged cell 2a. Further, the catalyst slurry is allowed to flow into each cell, and then, a surplus slurry is blown and flown with compressed air. Afterward, the catalyst slurry is dried and baked to obtain the honeycomb filter in which the catalyst is loaded onto the partition wall surfaces in the cells. As drying conditions of the catalyst slurry, the drying is preferably carried out in a range of 100 to 200° C. for 0.5 to 2 hours. In addition, as baking conditions, the baking is preferably carried out in a range of 600 to 800° C. for 0.5 to 2 hours.

It is to be noted that a method of loading the catalyst 12 onto the honeycomb substrate 7 including the plugging portions 3 is not limited to the abovementioned method by the suction. There is not any special restriction on the method as long as the amount of the catalyst 12a to be loaded onto the first partition walls is larger than the amount of the catalyst 12b to be loaded onto the second partition walls in the honeycomb filter 100 of the present embodiment. Therefore, the catalyst slurry loaded onto the partition walls is partially blown and flown with the compressed air or the like, whereby the amount of the catalyst to be loaded can be adjusted. For example, an example of a method of loading this catalyst is the following method. First, the catalyst slurry containing the catalyst 12 is prepared, and this prepared catalyst slurry is allowed to flow into the outlet plugged cells 2a and 2b by heretofore known dipping or the like. Further, after allowing the catalyst slurry to flow into the outlet plugged cells 2a and 2b, the surplus catalyst slurry is blown and flown with the compressed air. In this case, the compressed air is passed through the square outlet plugged cells 2b for a long time, and an amount of the catalyst slurry to be blown and flown is increased. In this way, the amount of the catalyst to be loaded onto the first partition walls is larger than the amount of the catalyst to be loaded onto the second partition walls. Afterward, the catalyst slurry is dried and baked by the abovementioned method, so that the honeycomb filter 100 can be obtained in which the catalyst 12 is loaded onto the partition wall surfaces in the cells 2.

An example of a method of obtaining the honeycomb filter 100 of the present embodiment as a constitution where the plurality of honeycomb segments are integrated is such a method as described below. For example, the plurality of honeycomb segments are bonded to one another by use of ceramic cement, and dried to harden, followed by processing a circumference into a desirable shape, so that the segment monolithic type of honeycomb filter 100 can be obtained.

In the honeycomb filter 100 of the present embodiment, a geometric surface area GSA is preferably from 10 to 30 $cm^2/cm^3$ and further preferably from 12 to 18 $cm^2/cm^3$ in the outlet plugged cells (the square outlet plugged cells 2b and the rectangular outlet plugged cells 2a). Here, the abovementioned "geometric surface area GSA" is a value (S/V) obtained by dividing a total inner surface area (S) of the outlet plugged cells by a total volume (V) of the honeycomb substrate 7. In general, as a filtration area of the filter becomes larger, a thickness of the PM deposited onto the partition walls can be reduced, so that the pressure loss can be minimized. When the geometric surface area GSA of the outlet plugged cells is smaller than 10 $cm^2/cm^3$, the pressure loss during the PM deposition increases in a certain case. In addition, when the geometric surface area is larger than 30 $cm^2/cm^3$, the initial pressure loss increases in a certain case.

In the honeycomb filter 100 of the present embodiment, a cell cross section open frontal area of the outlet plugged cells (the square outlet plugged cells 2b and the rectangular outlet plugged cells 2a) is preferably from 13 to 50% and further preferably from 14 to 42%. When the cell cross section open frontal area of the outlet plugged cells is smaller than 13%, the initial pressure loss increases in a certain case. In addition, when the open frontal area is in excess of 50%, a filtration rate becomes fast, so that the trapping efficiency of the PM deteriorates and further, the strength of the partition walls 1 becomes insufficient in a certain case. Here, "the cell cross section open frontal area of the outlet plugged cells" means a ratio of "the sum of sectional areas of the outlet plugged cells" to the total of "a total sectional area of the partition walls 1 forming the honeycomb substrate 7" and "the sum of sectional areas of all the cells 2" in the cross section perpendicular to the central axis direction of the honeycomb substrate 7. It is to be noted that "the outlet plugged cell" is a general term for the square outlet plugged cell 2b and the rectangular outlet plugged cell 2a. Therefore, "the sum of the sectional areas of the outlet plugged cells" is "the sum of the sectional areas of the square outlet plugged cells 2b and the rectangular outlet plugged cells 2a".

In view of trade-off among the initial pressure loss and the pressure loss during the PM deposition and the trapping efficiency, the honeycomb filter 100 of the present embodiment preferably has such a constitution as described below. That is, it is preferable to simultaneously satisfy the requirements that the geometric surface area GSA of the outlet plugged cells is from 10 to 30 $cm^2/cm^3$ and that the cell cross section open frontal area of the outlet plugged cells is from 20 to 70%. In addition, it is further preferable to simultaneously satisfy the requirements that the geometric surface area GSA of the outlet plugged cells is from 12 to 18 $cm^2/cm^3$ and that the cell cross section open frontal area of the outlet plugged cells is from 25 to 65%.

In the plurality of cells 2, each of the corner portions 6 of the cells 2 in the cross section perpendicular to the central axis direction of the honeycomb substrate 7 preferably has a curved shape having a radius. Here, "the corner portions 6" are corner portions described in the following (1) to (3): (1) portions forming four corners in a square sectional shape of the square outlet plugged cell 2b in which the length of one side is L2; (2) portions forming four corners in a rectangular sectional shape of the rectangular outlet plugged cell 2a in which the length of the long side is L1 and the length of the short side is L2; and (3) portions forming four corners in a square sectional shape of the inlet plugged cell 2c in which the length of one side is L1. The corner portion 6 of the curved shape having the radius preferably has a curved shape in which a curvature radius is from 0.05 to 0.4 mm, and further preferably has a curved shape in which a curvature radius is from 0.2 to 0.4 mm from the viewpoint of prevention of stress concentration. When the curvature radius of the corner portion 6 is smaller than 0.05 mm, the PM is easily deposited on the corner portions 6, and simultaneously, the thermal stress cannot be alleviated and the strength of the partition walls 1 deteriorate, so that a thermal stress alleviation effect cannot sufficiently be produced in a certain case. Additionally, when the curvature radius of the corner portion 6 is larger than 0.4 mm, the filtration area of the cells decreases in a certain case.

EXAMPLES

Hereinafter, the present invention will further specifically be described on the basis of examples, but the present invention is not limited to these examples.

Example 1

As a ceramic raw material, a mixture of silicon carbide (SiC) powder and metal silicon (Si) powder at a mass ratio of 80:20 was prepared. To this ceramic raw material, hydroxypropoxyl methylcellulose as a binder and a water absorbable resin as a pore former were added, and water was also added, to prepare a forming raw material. The obtained forming raw material was kneaded by using a kneader, to obtain a kneaded material.

Next, the obtained kneaded material was formed by using a vacuum extruder and 16 rectangular pillar-shaped honeycomb segments each having such a plugging arrangement as shown in FIG. 2 and FIG. 4 were prepared. A sectional shape of each honeycomb segment in a direction perpendicular to a cell extending direction was a square of 36 mm×36 mm and the segment had a length of 152 mm. In addition, a partition wall center distance a shown in FIG. 2 was set to 2.2 mm, a partition wall center distance b was set to 0.76 mm and a partition wall thickness t was 0.30 mm.

Subsequently, the obtained honeycomb segments were subjected to high frequency induction heating drying and then dried at 120° C. for 2 hours by use of a hot air drier. Additionally, during the drying, the honeycomb segments were arranged so that outflow end faces 5b were perpendicularly directed downwardly, to carry out the drying.

In the dried honeycomb segments, plugging portions were formed. First, a mask was applied to an inflow end face of each honeycomb segment. Next, each masked end face (an outflow end face) was immersed into a plugging slurry to charge the plugging slurry into open ends of cells (inlet plugged cells) which were not masked, and the plugging portions (inflow side plugging portions) were formed and dried. Further, also in the outflow end face of the dried honeycomb segment, plugging portions (outflow side plugging portions) were similarly formed in the residual cells (i.e., the cells which were not plugged in the inflow end face (rectangular outlet plugged cells and square outlet plugged cells)).

Further, the honeycomb segments in which the plugging portions were formed were degreased and fired, and the plugged honeycomb segments were obtained. As degreasing conditions, the degreasing was carried out at 550° C. for 3 hours, and as firing conditions, the firing was carried out at 1450° C. under an argon atmosphere for 2 hours. Additionally, during the firing, the honeycomb segments were arranged so that outflow end faces 5b were perpendicularly directed downwardly, to carry out the firing.

The 16 fired honeycomb segments were bonded and integrated by using a bonding material (ceramic cement). The bonding material was prepared by using inorganic particles and an inorganic adhesive as main components and including an organic binder, a surfactant, a foamable resin, water and the like as subcomponents. As the inorganic particles, plate-shaped particles were used, and as the inorganic adhesive, colloidal silica (silica sol) was used. As the plate-shaped particles, mica was used. A circumference of a honeycomb segment bonded body in which the 16 honeycomb segments were integrally bonded was ground and processed into a round pillar shape, and a coating material was applied to a circumferential surface of the bonded body to obtain a completed body (a honeycomb filter). The coating material was prepared to include ceramic powder, water and a bonding agent.

By the above steps, such a honeycomb substrate of plugging arrangement as shown in FIG. 2 and FIG. 4 was prepared. Table 1 shows, as X, the plugging arrangement in which one inlet plugged cell is surrounded with eight outlet plugged cells as shown in FIG. 2 and FIG. 4.

Next, in Example 1, there was prepared a catalyst slurry containing platinum (Pt) as a noble metal and further containing activated alumina and ceria as an oxygen absorber. A water content was regulated so that a slurry viscosity was from 10 to 15 Pa·sec. Next, the prepared catalyst slurry was stored in a container, and an inflow end face side of the honeycomb substrate including plugging portions was immersed into the catalyst slurry in the container, whereby the catalyst slurry was sucked through the inlet plugged cells from an outflow end face side of the honeycomb substrate. As conditions to suck the catalyst slurry through the inlet plugged cells, a suction pressure was set to 30 kPa, a suction flow rate was set to 0.5 L/min and a suction time was set to 5 minutes. In this manner, a coating layer of the prepared catalyst slurry was formed on partition wall inner surfaces of a honeycomb structure and inner surfaces of pores. Next, heating and drying were carried out, thereby preparing a honeycomb catalyst body having a pore structure of partition walls (with a catalyst layer) shown in Table 1. Additionally, an amount of the noble metal (Pt) per liter of the honeycomb structure (a carrier) was 2 g. In addition, a coating amount of the catalyst slurry per liter of the honeycomb structure (the carrier) was 20 g. In consequence, the catalyst slurry was loaded onto first partition walls defining rectangular outlet plugged cells and the inlet plugged cells and second partition walls defining the rectangular outlet plugged cells and square outlet plugged cells.

Afterward, a surplus slurry adhered to the first partition walls and the second partition walls was blown and flown with compressed air. Afterward, the catalyst slurry was dried and baked, thereby manufacturing the honeycomb filter in which a catalyst was loaded onto the partition wall surfaces in the cells. As drying conditions of the catalyst slurry, the drying was carried out at 120° C. for 1 hour. In addition, as baking conditions, the baking was carried out at 550° C. for 2 hours.

Examples 2 to 15 and Comparative Examples 1 to 13

The procedure of Example 1 was repeated except that a partition wall center distance a, a partition wall center distance b and a partition wall thickness t were set to values shown in Table 1, to prepare each honeycomb substrate including plugging portions. Further, a catalyst was loaded by a method similar to Example 1, except that an amount (g/L) of the loaded catalyst, a noble metal amount (g) in the catalyst, a noble metal amount (g) of first partition walls and a noble metal amount (g) of second partition walls were set to values of Table 2, to prepare each of honeycomb filters of Examples 2 to 15 and Comparative Examples 1 to 13.

Comparative Examples 14 and 15

The procedure of Example 1 was repeated except that plugging portions were arranged in a checkered manner and a partition wall center distance a, a partition wall center distance b and a partition wall thickness t were set to values shown in Table 1, to prepare a honeycomb filter 200 of each of Comparative Examples 14 and 15 having such a plugging arrangement as shown in FIG. 7. Table 1 shows, as Y, the plugging arrangement in which inlet plugged cells and outlet plugged cells are arranged in the checkered manner as shown in FIG. 7.

Each of the honeycomb filters of Examples 1 to 15 and Comparative Examples 1 to 15 was applied to a diesel engine, and an initial pressure loss, a pressure loss during PM deposition, a regeneration efficiency during forced regeneration and a continuous regeneration soot amount in an NEDC mode operation were measured and evaluated. Table 2 shows the results.

In addition, concerning each of the honeycomb filters of Examples 1 to 15 and Comparative Examples 1 to 15, an amount (g/L) of a loaded catalyst, a noble metal amount (g) in the catalyst, a noble metal amount (g) of first partition walls, a noble metal amount (g) of second partition walls and a noble metal amount ratio of the first partition walls were obtained by the following methods. Table 2 shows the results. It is to be noted that the catalyst loaded onto the first partition walls has the same noble metal concentration in the catalyst as the catalyst loaded onto the second partition walls, and hence, a ratio between the noble metal amount of the first partition walls and the noble metal amount of the second partition walls is a ratio between the amount of the catalyst loaded onto the first partition walls and the amount of the catalyst loaded onto the second partition walls.

(Measuring Method of Initial Pressure Loss)

Air at 200° C. was allowed to flow through the honeycomb filter at 2.4 Nm$^3$/min to measure a pressure loss in an initial stage (the initial pressure loss (kPa)) from a pressure difference between an inflow side and an outflow side. Here, a heat capacity is a function of a cell cross section open frontal area (OFA) and is proportional to (1−OFA). Therefore, the larger the OFA is, the smaller the heat capacity becomes, and hence, cracks are easily generated during honeycomb filter regeneration. As an index which satisfies both of requirements that the initial pressure loss is low and that the cracks are hard to be generated during the honeycomb filter regeneration, α=(the initial pressure loss)×(OFA)$^2$ is used. It can be judged that, as α is smaller, the honeycomb filter is excellent in performance. Specifically, it is judged that when α is 0.66 or more, the honeycomb filter fails, and when α is smaller than 0.66, the honeycomb filter passes.

(Measuring Method of Pressure Loss During PM Deposition)

Light oil was burnt in a state where oxygen was running short, to generate soot, and dilution air was added to a combustion gas having a soot generation amount of 10 g/h, whereby the soot-containing combustion gas was regulated and allowed to flow through the honeycomb filter at a temperature of 200° C. and a flow rate of 2.4 Nm$^3$/min. Further, the pressure loss during the PM deposition (the PM deposition pressure loss (kPa)) was measured from the pressure difference between the inflow side and the outflow side when the amount of the soot deposited onto the honeycomb filter was 4 g/L. It is to be noted that, as described above, the heat capacity is the function of the cell cross section open frontal area (OFA) and is proportional to (1−OFA). Therefore, the lager the OFA is, the smaller the heat capacity becomes, and hence, the cracks are easily generated during the honeycomb filter regeneration. As an index which satisfies both of requirements that the PM deposition pressure loss is low and that the cracks are hard to be generated during the honeycomb filter regeneration, β=(the PM deposition pressure loss)×(OFA)$^2$ is used. It can be judged that, as β is smaller, the honeycomb filter is excellent in performance. Specifically, it is judged that when β is 4.30 or more, the honeycomb filter fails, and when β is smaller than 4.30, the honeycomb filter passes.

(Regeneration Efficiency During Forced Regeneration)

In a state where 6 g/L of the soot was deposited onto the partition walls of the honeycomb filter, a high-temperature gas was passed from an inflow end face of the honeycomb filter, to carry out forced regeneration of the filter. For conditions of the forced regeneration, the temperature of the gas in the inflow end face was set to 650° C. and a passing time of the gas was set to 15 minutes. In addition, a mass of the honeycomb filter in which the soot was deposited was measured prior to the forced regeneration. After the forced regeneration, the mass of the honeycomb filter was measured, and a mass of the soot lost by the forced regeneration was obtained. A regeneration efficiency (M2/M1×100) during the forced regeneration was obtained from a mass M1 of the deposited soot and a mass M2 of the soot lost by the forced regeneration. Table 2 shows the regeneration efficiency during the forced regeneration as "the regeneration efficiency (%)".

(Continuous Regeneration Soot Amount in NEDC Mode Operation)

In a state where 6 g/L of the soot was deposited onto the partition walls of the honeycomb filter, a continuous regeneration soot amount was measured under the NEDC (New European Driving Cycle) mode operation of a 4-cylinder 2000 cc diesel engine car of common rail injection in a chassis bench. The NEDC mode operation is an operation under conditions of a car speed pattern in conformity with European regulations. Additionally, a mass of the honeycomb filter in which the soot was deposited was measured prior to the NEDC mode operation. After the NEDC mode operation, the mass of the honeycomb filter was measured, and a mass of the soot burnt and lost in the NEDC mode operation was obtained. From a mass M3 of the deposited soot and a mass M4 of the soot burnt and lost by the NEDC mode operation, the continuous regeneration soot amount (M4−M3) in the NEDC mode operation was obtained. Table 2 shows the continuous regeneration soot amount in the NEDC mode operation as "the continuous regeneration soot amount (g/L)".

(General Evaluation)

From the measured pressure loss in the initial stage, the measured pressure loss during the PM deposition, the measured regeneration efficiency during the forced regeneration and the measured continuous regeneration soot amount in the NEDC mode operation, evaluations of excellent, good and failure were carried out in accordance with the following judgment standards. Evaluation "excellent": a case where the regeneration efficiency during the forced regeneration is 70% or more, the continuous regeneration soot amount in the NEDC mode operation is 1.0 (g/L) or more, a value of a is smaller than 0.60 and a value of β is smaller than 4.22. Evaluation "good": a case where the regeneration efficiency during the forced regeneration is 70% or more, the continuous regeneration soot amount in the NEDC mode operation is 1.0 (g/L) or more, a value of a is smaller than 0.66 and a value of β is smaller than 4.30. Evaluation "failure": a case where the regeneration efficiency during the forced regeneration is smaller than 70%, or the continuous regeneration soot amount in the NEDC mode operation is smaller than 1.0 (g/L), or a value of a is 0.66 or more or a value of β is 4.30 or more.

(Amount of Loaded Catalyst (g/L))

Concerning the honeycomb filter of each example, a mass in a state before catalyst loading and a mass in a state after the catalyst loading were measured. The mass of the honeycomb filter was measured after drying the honeycomb filter in each of the states before the catalyst loading and after the catalyst loading. A mass of the catalyst was calculated from a difference between the mass of the honeycomb filter before the catalyst loading and the mass of the honeycomb filter after the catalyst loading. From the calculated mass of the catalyst and a volume of the honeycomb filter, an amount (g/L) of the catalyst loaded onto the partition walls of the honeycomb filter was measured. Table 2 shows the measured amount (g/L) of the catalyst as "the amount of the loaded catalyst (g/L)".

(Noble Metal Amount (g))

The prepared honeycomb filter was cut, a small test piece was cut out, and the cut-out test piece was embedded in a resin. After the resin embedding, an end face of the test piece was polished, and the polished face was subjected to SEM photographing. By image analysis concerning a photographed image, ratios of voids, the honeycomb substrate and the catalyst were obtained, and the amount (g) of the noble metal loaded onto the partition walls of the honeycomb filter was calculated from the ratio of the catalyst and a known concentration of the noble metal in the catalyst. Table 2 shows the calculated noble metal amount (g) as "the noble metal amount (g)".

(Noble Metal Amount (g) of First Partition Wall)

A portion of each first partition wall of the prepared honeycomb filter was cut, a small test piece was cut out, and the cut-out test piece was embedded in the resin. After the resin embedding, an end face of the test piece was polished, and the polished face was subjected to SEM photographing. By image analysis concerning a photographed image, ratios of voids of the first partition wall, the honeycomb substrate and the catalyst were obtained. The amount (g) of the noble metal loaded onto the partition walls of the honeycomb filter was calculated from the ratio of the catalyst and a known concentration of the noble metal in the catalyst. Table 2 shows the calculated noble metal amount (g) as "the noble metal amount (g) of the first partition wall".

(Noble Metal Amount (g) of Second Partition Wall)

A portion of each second partition wall of the prepared honeycomb filter was cut, a small test piece was cut out, and the cut-out test piece was embedded in the resin. After the resin embedding, an end face of the test piece was polished, and the polished face was subjected to SEM photographing. By image analysis concerning a photographed image, ratios of voids of the second partition wall, the honeycomb substrate and the catalyst were obtained. The amount (g) of the noble metal loaded onto the partition walls of the honeycomb filter was calculated from the ratio of the catalyst and a known concentration of the noble metal in the catalyst. Table 2 shows the calculated noble metal amount (g) as "the noble metal amount (g) of the second partition wall".

(Noble Metal Amount Ratio of First Partition Wall)

A noble metal amount ratio of the first partition wall was calculated from the noble metal amount of the first partition wall and the noble metal amount of the second partition wall. The noble metal amount ratio of the first partition wall is calculated by M1/(M1+M2), in which M1 is the noble metal amount of the first partition wall and M2 is the noble metal amount of the second partition wall. Table 1 shows the calculated noble metal amount ratio of the first partition wall as "the noble metal amount ratio of the first partition wall".

TABLE 1

| | a | b | t | b/a | b/at | Plugging arrangement | Amount of loaded catalyst (g/L) | Noble metal amount (g) | Noble metal amount of first partition wall (g) | Noble metal amount of second partition wall (g) | Noble metal amount ratio of first partition wall |
|---|---|---|---|---|---|---|---|---|---|---|---|
| Comparative Example 1 | 2.3 | 0.60 | 0.30 | 0.26 | 0.88 | X | 20.0 | 0.90 | 0.82 | 0.08 | 0.91 |
| Example 1 | 2.2 | 0.66 | 0.30 | 0.30 | 1.01 | X | 19.6 | 0.88 | 0.78 | 0.10 | 0.89 |
| Example 2 | 2.1 | 0.71 | 0.30 | 0.34 | 1.13 | X | 18.9 | 0.85 | 0.74 | 0.11 | 0.87 |
| Example 3 | 1.7 | 0.89 | 0.30 | 0.52 | 1.74 | X | 18.9 | 0.85 | 0.66 | 0.19 | 0.78 |
| Comparative Example 2 | 1.6 | 0.92 | 0.30 | 0.58 | 1.92 | X | 18.4 | 0.83 | 0.63 | 0.20 | 0.76 |
| Comparative Example 3 | 2.4 | 0.67 | 0.32 | 0.28 | 0.88 | X | 19.8 | 0.89 | 0.80 | 0.09 | 0.90 |
| Example 4 | 2.3 | 0.73 | 0.32 | 0.32 | 0.99 | X | 19.6 | 0.88 | 0.77 | 0.11 | 0.88 |
| Example 5 | 2.2 | 0.78 | 0.32 | 0.35 | 1.11 | X | 19.6 | 0.88 | 0.76 | 0.12 | 0.86 |
| Example 6 | 1.7 | 0.98 | 0.32 | 0.58 | 1.80 | X | 19.3 | 0.87 | 0.66 | 0.21 | 0.76 |
| Comparative Example 4 | 1.6 | 1.02 | 0.32 | 0.64 | 1.99 | X | 19.1 | 0.86 | 0.63 | 0.23 | 0.73 |
| Comparative Example 5 | 2.5 | 0.75 | 0.34 | 0.30 | 0.88 | X | 19.3 | 0.87 | 0.77 | 0.10 | 0.89 |
| Example 7 | 2.4 | 0.80 | 0.34 | 0.33 | 0.98 | X | 19.3 | 0.87 | 0.76 | 0.11 | 0.87 |
| Example 8 | 2.3 | 0.85 | 0.34 | 0.37 | 1.08 | X | 19.1 | 0.86 | 0.73 | 0.13 | 0.85 |
| Example 9 | 1.7 | 1.08 | 0.34 | 0.63 | 1.86 | X | 19.1 | 0.86 | 0.63 | 0.23 | 0.73 |
| Comparative Example 6 | 1.6 | 1.10 | 0.34 | 0.69 | 2.03 | X | 19.1 | 0.86 | 0.61 | 0.25 | 0.71 |
| Comparative Example 7 | 2.1 | 0.27 | 0.16 | 0.13 | 0.80 | X | 20.4 | 0.92 | 0.89 | 0.03 | 0.96 |
| Example 10 | 2.0 | 0.34 | 0.16 | 0.17 | 1.05 | X | 20.0 | 0.90 | 0.85 | 0.05 | 0.94 |
| Example 11 | 1.7 | 0.49 | 0.16 | 0.29 | 1.79 | X | 19.8 | 0.89 | 0.78 | 0.11 | 0.88 |
| Comparative Example 8 | 1.6 | 0.52 | 0.16 | 0.33 | 2.04 | X | 19.8 | 0.89 | 0.76 | 0.13 | 0.86 |
| Comparative Example 9 | 2.0 | 0.34 | 0.18 | 0.17 | 0.93 | X | 20.0 | 0.90 | 0.85 | 0.05 | 0.95 |
| Example 12 | 1.9 | 0.40 | 0.18 | 0.21 | 1.16 | X | 19.8 | 0.89 | 0.82 | 0.07 | 0.92 |
| Example 13 | 1.6 | 0.52 | 0.18 | 0.33 | 1.81 | X | 19.8 | 0.89 | 0.77 | 0.12 | 0.86 |
| Comparative Example 10 | 1.5 | 0.56 | 0.18 | 0.37 | 2.06 | X | 19.6 | 0.88 | 0.74 | 0.14 | 0.84 |
| Comparative Example 11 | 2.0 | 0.34 | 0.20 | 0.17 | 0.84 | X | 19.8 | 0.89 | 0.85 | 0.04 | 0.95 |
| Example 14 | 1.9 | 0.40 | 0.20 | 0.21 | 1.04 | X | 19.6 | 0.88 | 0.82 | 0.06 | 0.93 |
| Example 15 | 1.5 | 0.56 | 0.20 | 0.37 | 1.86 | X | 19.3 | 0.87 | 0.74 | 0.13 | 0.85 |
| Comparative Example 12 | 1.4 | 0.59 | 0.20 | 0.42 | 2.11 | X | 19.3 | 0.87 | 0.72 | 0.15 | 0.82 |
| Comparative Example 13 | 2.3 | 0.60 | 0.30 | 0.26 | 0.88 | X | 22.0 | 0.90 | 0.78 | 0.12 | 0.87 |

TABLE 1-continued

| | a | b | t | b/a | b/at | Plugging arrangement | Amount of loaded catalyst (g/L) | Noble metal amount (g) | Noble metal amount of first partition wall (g) | Noble metal amount of second partition wall (g) | Noble metal amount ratio of first partition wall |
|---|---|---|---|---|---|---|---|---|---|---|---|
| Comparative Example 14 | 2.1 | 0.71 | 0.30 | 0.34 | 1.13 | Y | 22.2 | 1.0 | 0.9 | 0.1 | 0.87 |
| Comparative Example 15 | 1.5 | 1.47 | 0.30 | 1.00 | 3.33 | Y | 24.4 | 1.1 | 0.7 | 0.4 | 0.60 |

TABLE 2

| | OFA | Initial pressure loss (kPa) | PM deposition pressure loss (kPa) | α | β | Regeneration efficiency (%) | Continuous regeneration soot amount (g/L) | General judgment (excluding catalyst amount) |
|---|---|---|---|---|---|---|---|---|
| Comparative Example 1 | 0.64 | 0.87 | 10.70 | 0.36 | 4.38 | 96 | 2.0 | Failure |
| Example 1 | 0.64 | 0.90 | 10.33 | 0.37 | 4.23 | 97 | 2.0 | Good |
| Example 2 | 0.64 | 0.95 | 10.14 | 0.39 | 4.15 | 96 | 2.0 | Excellent |
| Example 3 | 0.64 | 1.32 | 9.84 | 0.54 | 4.03 | 95 | 2.0 | Excellent |
| Comparative Example 2 | 0.64 | 1.61 | 9.88 | 0.66 | 4.05 | 95 | 2.0 | Failure |
| Comparative Example 3 | 0.64 | 0.83 | 10.65 | 0.34 | 4.36 | 94 | 1.5 | Failure |
| Example 4 | 0.64 | 0.87 | 10.28 | 0.36 | 4.21 | 95 | 1.5 | Excellent |
| Example 5 | 0.64 | 0.91 | 10.12 | 0.37 | 4.15 | 94 | 1.5 | Excellent |
| Example 6 | 0.64 | 1.38 | 9.95 | 0.56 | 4.08 | 94 | 1.5 | Excellent |
| Comparative Example 4 | 0.64 | 1.62 | 10.04 | 0.66 | 4.11 | 93 | 1.5 | Failure |
| Comparative Example 5 | 0.64 | 0.79 | 10.47 | 0.32 | 4.31 | 92 | 1.3 | Failure |
| Example 7 | 0.64 | 0.83 | 10.22 | 0.34 | 4.19 | 92 | 1.3 | Excellent |
| Example 8 | 0.64 | 0.88 | 10.11 | 0.36 | 4.14 | 91 | 1.3 | Excellent |
| Example 9 | 0.64 | 1.41 | 10.10 | 0.58 | 4.14 | 92 | 1.3 | Excellent |
| Comparative Example 6 | 0.64 | 1.65 | 10.24 | 0.68 | 4.19 | 92 | 1.3 | Failure |
| Comparative Example 7 | 0.77 | 0.97 | 7.59 | 0.57 | 4.50 | 97 | 2.5 | Failure |
| Example 10 | 0.77 | 0.95 | 7.18 | 0.56 | 4.26 | 96 | 2.5 | Good |
| Example 11 | 0.77 | 0.99 | 6.43 | 0.59 | 3.81 | 96 | 2.5 | Excellent |
| Comparative Example 8 | 0.77 | 1.08 | 6.26 | 0.64 | 3.71 | 96 | 2.5 | Failure |
| Comparative Example 9 | 0.77 | 0.99 | 7.59 | 0.59 | 4.50 | 95 | 2.3 | Failure |
| Example 12 | 0.77 | 0.99 | 7.10 | 0.59 | 4.21 | 95 | 2.3 | Excellent |
| Example 13 | 0.77 | 1.00 | 6.48 | 0.59 | 3.84 | 94 | 2.3 | Excellent |
| Comparative Example 10 | 0.77 | 1.19 | 6.33 | 0.70 | 3.75 | 94 | 2.3 | Failure |
| Comparative Example 11 | 0.77 | 1.00 | 7.69 | 0.59 | 4.56 | 93 | 2.1 | Failure |
| Example 14 | 0.77 | 1.00 | 7.35 | 0.59 | 4.29 | 93 | 2.1 | Good |
| Example 15 | 0.77 | 1.05 | 6.56 | 0.62 | 3.89 | 93 | 2.1 | Good |
| Comparative Example 12 | 0.77 | 1.33 | 6.45 | 0.79 | 3.82 | 93 | 2.1 | Failure |
| Comparative Example 13 | 0.64 | 0.87 | 10.70 | 0.36 | 4.38 | 96 | 2.0 | — |
| Comparative Example 14 | 0.64 | 0.95 | 10.14 | 0.39 | 4.15 | 78 | 0.3 | Failure |
| Comparative Example 15 | 0.64 | 2.15 | 11.79 | 0.88 | 4.83 | 72 | 0.2 | Failure |

(Result)

It has been seen from Table 1 and Table 2 that, as compared with a conventional filter in which plugging portions are arranged in a checkered manner, honeycomb filters of Examples 1 to 15 having a cell sectional structure shown in FIG. 2 and FIG. 4 indicate suitable results in any one of an initial pressure loss, a pressure loss during PM deposition, a regeneration efficiency during forced regeneration and a continuous regeneration soot amount in an NEDC mode operation. In addition, it has been seen that, in a case where a value b/at obtained by dividing a product of a partition wall center distance a and a partition wall thickness t by a partition wall center distance b is larger than 0.95 and smaller than 1.90, more significant effects are produced in any one of the initial pressure loss and the pressure loss during the PM deposition, as compared with the other cases.

In addition, Example 1 and Comparative Example 13 indicate about the same values in any one of the initial pressure loss, the pressure loss during the PM deposition, the regeneration efficiency during the forced regeneration and the continuous regeneration soot amount in the NEDC mode operation. However, the amount of the loaded catalyst (i.e., the noble metal amount) of Comparative Example 13 was larger than that of Example 1. That is, it has been found that Comparative Example 13 hardly contributes to the honeycomb substrate in terms of improvement of a soot regeneration ratio, and a surplus catalyst is loaded, which incurs increase of manufacturing cost.

A honeycomb filter according to the present invention is suitably usable as a DPF for use in purification of particulates and toxic gas components included in an exhaust gas emitted from a direct injection type gasoline engine, a diesel engine or the like.

DESCRIPTION OF REFERENCE NUMERALS

1: partition wall, 2: cell, 2a: rectangular outlet plugged cell (outlet plugged cell), 2b: square outlet plugged cell (outlet plugged cell), 2c: inlet plugged cell, 3: plugging portion, 3a: inflow side plugging portion, 3b: outflow side plugging portion, 4: side, 5a: inflow end face, 5b: outflow end face, 6: corner portion, 7: honeycomb substrate, 8: first side of the inlet plugged cell, 9: second side of the inlet plugged cell, 10: first long side of the rectangular outlet plugged cell, 11: second long side of the rectangular outlet plugged cell, 12, 12a and 12b: catalyst, 100: honeycomb filter, 200: honeycomb filter, 201: partition wall, 202: cell, 202a: outlet plugged cell, 202b and 202c: inlet plugged cell, 203: plugging portion, 205a: inflow end face, a: partition wall center distance, b: partition wall center distance, and t: partition wall thickness.

What is claimed is:

1. A honeycomb filter comprising:
a honeycomb substrate having porous partition walls defining a plurality of cells which extend from an inflow end face as an end face on an exhaust gas inflow side to an outflow end face as an end face on an exhaust gas outflow side and which become through channels for a fluid; and
plugging portions disposed in end portions of the plurality of cells on one of an inflow end face side and an outflow end face side,
wherein the cells of part of the plurality of cells are inlet plugged cells whose end portions are closed by the plugging portions on the inflow end face side of the honeycomb substrate, and the residual cells among the plurality of cells are outlet plugged cells whose end portions are closed by the plugging portions on the outflow end face side of the honeycomb substrate,
the honeycomb filter further comprising:
a catalyst which is loaded onto at least one of the surface of each of the partition walls defining the outlet plugged cells and an inner portion of each of pores of the partition walls, to purify the exhaust gas,
wherein the plurality of cells are arranged so that a periphery of one of the inlet plugged cells is surrounded with eight of the outlet plugged cells in a cross section perpendicular to a central axis direction of the honeycomb substrate,
a shape of an open end of each of the inlet plugged cells in the cross section is a square in which a length of one side is L1,
the outlet plugged cells include square outlet plugged cells and rectangular outlet plugged cells,
a shape of an open end of each of the square outlet plugged cells in the cross section is a square in which a length of one side is L2, and L2 is smaller than L1,
a shape of an open end of each of the rectangular outlet plugged cells in the cross section is a rectangle in which a length of a long side is L1 and a length of a short side is L2,
in each diagonal direction of the square in which the length of the one side is L1 in the cross section, four of the square outlet plugged cells are arranged adjacent to the inlet plugged cell,
in a linear direction perpendicular to each side of the square in which the length of the one side is L1 in the cross section, four of the rectangular outlet plugged cells are arranged so that the cells are adjacent to the inlet plugged cell and so that the long side of the rectangle in the cross section is parallel to one side of the square in which the length of the one side is L1 in the cross section,
a partition wall thickness of the partition walls of the honeycomb substrate is defined as t,
a distance from an intermediate point of the thickness of the partition wall defining one side of the open end of the square in which the length of the one side is L1 in the cross section of the honeycomb substrate to an intermediate point of the thickness of the partition wall defining a side facing the one side is defined as a partition wall center distance a,
a distance from an intermediate point of the thickness of the partition wall defining a long side of the open end of the rectangle in the cross section of the honeycomb substrate to an intermediate point of the thickness of the partition wall defining a side facing the long side is defined as a partition wall center distance b,
the partition wall center distance a, the partition wall center distance b and the partition wall thickness t satisfy the following equation (1), and
an amount of the catalyst per unit volume of the partition walls which is loaded onto the partition walls defining the rectangular outlet plugged cells and the inlet plugged cells is larger than an amount of the catalyst per unit volume of the partition walls which is loaded onto the partition walls defining the rectangular outlet plugged cells and the square outlet plugged cells, $$0.95 < b/at < 1.90 \tag{1}$$

2. The honeycomb filter according to claim 1, wherein the partition wall defining the rectangular outlet plugged cell and the inlet plugged cell has a high noble metal loading region where a large amount of a noble metal as the catalyst is loaded, and the partition wall defining the rectangular outlet plugged cell and the square outlet plugged cell has a low noble metal loading region where a smaller amount of the noble metal is loaded than in the high noble metal loading region.

3. The honeycomb filter according to claim 2, wherein the partition wall center distance a is 1.4 mm or more and 2.4 mm or less.

4. The honeycomb filter according to claim 3, wherein the partition wall center distance b is 0.22 mm or more and 1.08 mm or less.

5. The honeycomb filter according to claim 2, wherein the partition wall center distance b is 0.22 mm or more and 1.08 mm or less.

6. The honeycomb filter according to claim 1,
wherein the partition wall center distance a is 1.4 mm or more and 2.4 mm or less.

7. The honeycomb filter according to claim 6,
wherein the partition wall center distance b is 0.22 mm or more and 1.08 mm or less.

8. The honeycomb filter according to claim 1,
wherein the partition wall center distance b is 0.22 mm or more and 1.08 mm or less.

9. The honeycomb filter according to claim 1,
wherein the partition wall thickness t is 0.16 mm or more and 0.34 mm or less.

10. The honeycomb filter according to claim 1,
wherein a cell density of the honeycomb substrate is from 100 to 650 cells/cm$^2$.

11. The honeycomb filter according to claim 1,
wherein an open frontal area of the outlet plugged cells on the inflow end face side is from 13 to 50%.

12. The honeycomb filter according to claim 1,
wherein a porosity of the partition walls is from 28 to 70%.

13. The honeycomb filter according to claim 1,
wherein a catalyst amount on an inflow end portion side of the partition wall defining the outlet plugged cell is larger than a catalyst amount of an outflow end portion side of the partition wall defining the outlet plugged cell.

14. The honeycomb filter according to claim 1,
wherein the catalyst is a catalyst including at least one selected from the group consisting of platinum, palladium, rhodium and ruthenium.

* * * * *